US010369850B2

(12) United States Patent
Merino Lopez et al.

(10) Patent No.: US 10,369,850 B2
(45) Date of Patent: Aug. 6, 2019

(54) TIRE WITH SPECIFIED BEAD STRUCTURE AND SELF-SEALING PRODUCT AND WHEEL ASSEMBLY WITH SAME

(71) Applicants: COMPAGNIE GENERALE DES ETABLISSEMENTS MICHELIN, Clermont-Ferrand (FR); Michelin Recherche et Technique S.A., Granges-Paccot (CH)

(72) Inventors: Jose Merino Lopez, Clermont-Ferrand (FR); Michel Ahouanto, Clermont-Ferrand (FR); Serge Lefebvre, Clermont-Ferrand (FR); Julien Flament, Clermont-Ferrand (FR)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 1121 days.

(21) Appl. No.: 14/389,882

(22) PCT Filed: Apr. 2, 2013

(86) PCT No.: PCT/EP2013/056932
§ 371 (c)(1),
(2) Date: Oct. 1, 2014

(87) PCT Pub. No.: WO2013/150024
PCT Pub. Date: Oct. 10, 2013

(65) Prior Publication Data
US 2015/0075691 A1    Mar. 19, 2015

(30) Foreign Application Priority Data

Apr. 5, 2012   (FR) ...................................... 12 53124

(51) Int. Cl.
*B60C 17/00* (2006.01)
*B60C 19/12* (2006.01)
(Continued)

(52) U.S. Cl.
CPC ................ *B60C 19/12* (2013.01); *B60C 1/00* (2013.01); *B60C 1/0008* (2013.01);
(Continued)

(58) Field of Classification Search
CPC ........ B60C 17/0009; B60C 2017/0072; B60C 19/122; B60C 19/12; B60C 23/0493;
(Continued)

(56) References Cited

U.S. PATENT DOCUMENTS 4,067,235 A * 1/1978 Markland ........... B60C 23/0493
4,193,437 A * 3/1980 Powell ................ B60C 17/0009
152/517 X
(Continued)

FOREIGN PATENT DOCUMENTS

CN      102256815 A      11/2011
EP      0 243 851 A1     11/1987
(Continued)

OTHER PUBLICATIONS

International Search Report PCT/ISA/210 dated Jul. 24, 2013 in the international application PCT/EP2013/056932.*
(Continued)

*Primary Examiner* — Adrienne C. Johnstone
(74) *Attorney, Agent, or Firm* — Venable LLP

(57) ABSTRACT

A tire has a form of a torus that is open radially on an inside portion. The tire includes inner and outer walls, a crown, two sidewalls, two beads, a crown reinforcement, and a carcass reinforcement anchored in the beads and extending at least from the beads as far as the crown. The inner wall is covered at least in part with an airtight layer, and the airtight layer is
(Continued)

covered at least in part with a layer of a self-sealing product. Each of the beads includes an annular reinforcing structure, with each annular reinforcing structure being formed of a plurality of windings of a single metal thread. The windings are arranged in a plurality of radially superposed layers, with each layer having a group of the windings arranged axially in a side by side manner, such that the superposed layers have a hexagonal cross section.

29 Claims, 6 Drawing Sheets

(51) Int. Cl.
  *B60C 23/04* (2006.01)
  *B60C 15/04* (2006.01)
  *B60C 15/06* (2006.01)
  *B60C 15/00* (2006.01)
  *B60C 1/00* (2006.01)
  *B29C 73/16* (2006.01)

(52) U.S. Cl.
  CPC .......... *B60C 15/0009* (2013.01); *B60C 15/04* (2013.01); *B60C 15/06* (2013.01); *B60C 15/0603* (2013.01); *B60C 17/0009* (2013.01); *B60C 19/122* (2013.01); *B29C 73/163* (2013.01); *B60C 23/04* (2013.01); *B60C 2015/009* (2013.01); *B60C 2015/048* (2013.01); *B60C 2015/061* (2013.01); *B60C 2015/0614* (2013.01); *B60C 2015/0617* (2013.01); *B60C 2015/0621* (2013.01); *B60C 2017/0072* (2013.01); *Y10T 152/10666* (2015.01); *Y10T 152/10675* (2015.01); *Y10T 152/10684* (2015.01); *Y10T 152/10828* (2015.01); *Y10T 152/10837* (2015.01); *Y10T 152/10846* (2015.01)

(58) Field of Classification Search
  CPC ..... B60C 15/04; B60C 15/06; B60C 15/0603; B60C 2015/048; B60C 2015/009; B60C 2015/061; B60C 2015/0614; B60C 2015/0617; B60C 2015/0621; B60C 1/00; B60C 15/0009; B60C 15/0607; B60C 23/04; Y10T 152/10828; Y10T 152/10837; Y10T 152/10846; Y10T 152/10684; Y10T 152/10675; B29C 73/163
  See application file for complete search history.

(56) References Cited

U.S. PATENT DOCUMENTS

| | | | | |
|---|---|---|---|---|
| 4,287,924 | A * | 9/1981 | Deck | B60C 17/0009 152/517 X |
| 4,770,222 | A * | 9/1988 | Mezzanotte | B60C 17/0009 |
| 4,795,523 | A | 1/1989 | Laurent et al. | |
| 4,804,436 | A | 2/1989 | Debroche et al. | |
| 4,895,692 | A | 1/1990 | Laurent et al. | |
| 4,913,209 | A | 4/1990 | Hong et al. | |
| 4,917,164 | A * | 4/1990 | Ushikubo | B60C 17/0009 152/517 |
| 4,952,259 | A | 8/1990 | Debroche et al. | |
| 4,963,207 | A | 10/1990 | Laurent | |
| 5,085,942 | A | 2/1992 | Hong et al. | |
| 5,295,525 | A | 3/1994 | Sanda, Jr. | |
| 5,785,781 | A | 7/1998 | Drieux et al. | |
| 5,916,931 | A | 6/1999 | Adams et al. | |
| 5,977,238 | A | 11/1999 | Labauze | |
| 6,420,488 | B1 | 7/2002 | Penot | |
| 6,543,504 | B2 * | 4/2003 | Auxerre | B60C 15/06 152/547 X |
| 6,815,473 | B2 | 11/2004 | Robert et al. | |
| 7,159,452 | B2 | 1/2007 | Tatraux-Paro et al. | |
| 7,201,199 | B2 * | 4/2007 | Tonezzer | B60C 15/04 152/540 X |
| 7,335,692 | B2 | 2/2008 | Vasseur et al. | |
| 8,602,075 | B2 | 10/2013 | Albert et al. | |
| 8,833,415 | B2 | 9/2014 | Greiveldinger et al. | |
| 2005/0092415 | A1 * | 5/2005 | Dahlberg | B60C 17/0009 152/517 X |
| 2006/0089445 | A1 | 4/2006 | Gandon-Pain | |
| 2009/0160078 | A1 | 6/2009 | Abad et al. | |
| 2009/0294007 | A1 | 12/2009 | Vorreiter | |
| 2010/0032070 | A1 | 2/2010 | Albert et al. | |
| 2011/0039976 | A1 | 2/2011 | Vasseur | |
| 2012/0073724 | A1 | 3/2012 | Daval | |
| 2012/0199260 | A1 | 8/2012 | Merino Lopez et al. | |

FOREIGN PATENT DOCUMENTS

| | | |
|---|---|---|
| EP | 0 248 301 A1 | 12/1987 |
| EP | 0 264 600 A1 | 4/1988 |
| EP | 0 492 504 A1 | 7/1992 |
| EP | 0 673 324 A | 9/1995 |
| EP | 1 650 543 A1 | 4/2006 |
| EP | 2 130 690 A2 | 12/2009 |
| FR | 2 910 382 A1 | 6/2008 |
| FR | 2 910 478 A1 | 6/2008 |
| FR | 2 925 388 A1 | 6/2009 |
| JP | 4-296541 B2 | 7/2009 |
| JP | 2009-292465 A | 12/2009 |
| JP | 2010-513120 A | 4/2010 |
| WO | WO 00/05300 A1 | 2/2000 |
| WO | WO 01/54929 A1 | 8/2001 |
| WO | WO 02/30689 A1 | 4/2002 |
| WO | WO 02/088238 A1 | 11/2002 |
| WO | WO 2008/080556 A1 | 7/2008 |
| WO | WO 2009/083160 A1 | 7/2009 |
| WO | WO 2010/072736 A1 | 7/2010 |
| WO | WO-2010/072737 A1 * | 7/2010 |
| WO | WO 2011/009909 A1 | 1/2011 |
| WO | WO 2011/032886 A1 | 3/2011 |
| WO | WO-2011/157661 A1 * | 12/2011 |
| WO | WO 2012/080121 A1 | 6/2012 |

OTHER PUBLICATIONS

Written Opinion of the International Searching Authority PCT/ISA/237 dated Jul. 24, 2013 in the international application PCT/EP2013/056932.*

R. Mildenberg, et al., "Hydrocarbon Resins," New York, VCH (John Wiley Co.), 1997, Chapter 5.5: "Rubber Tires and Mechanical Rubber Goods," pp. 141-146.

* cited by examiner

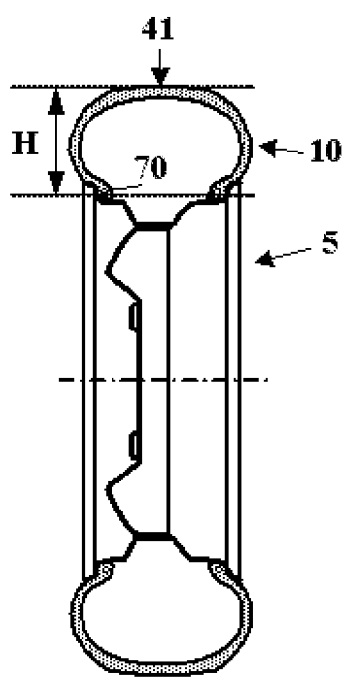
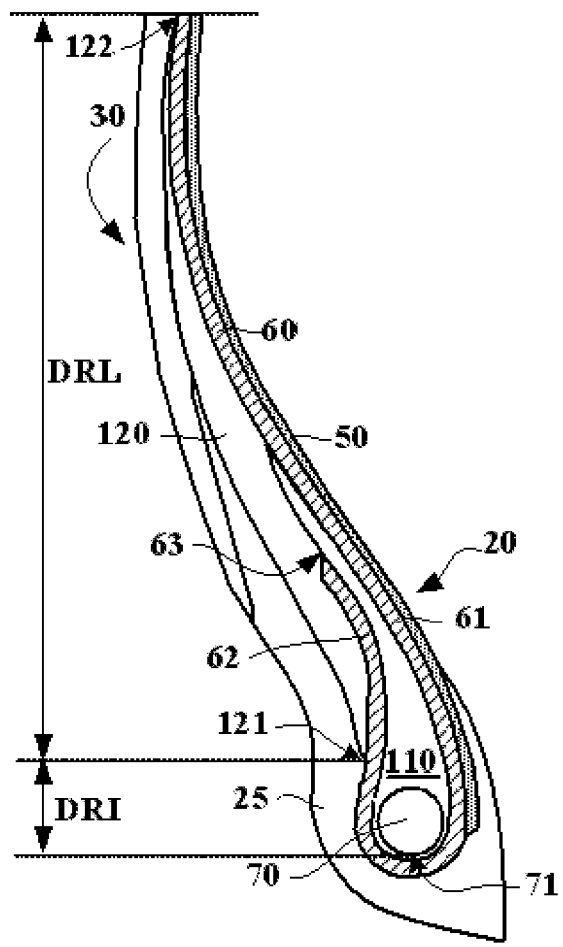
FIG. 2
Fig. 3
(PRIOR ART)

TIRE WITH SPECIFIED BEAD STRUCTURE AND SELF-SEALING PRODUCT AND WHEEL ASSEMBLY WITH SAME

FIELD OF THE INVENTION

The present invention relates to tyres, and more particularly to tyres suitable for providing extended mobility to the vehicle which is equipped with them.

STATE OF THE ART

During a perforation of the wall of a tyre by a perforating object, such as a screw or a nail, or "puncture", the inflating air of the tyre can escape via the perforation and the resulting loss in pressure can result in a flattening of the tyre and in the halting of the vehicle.

The normal solution, in order to solve this problem of punctures, which dates from the very beginning of the use of road wheels having inflated tyres, is to stop and to replace the wheel concerned with a spare wheel.

Other solutions have been devised and are available on the market in order to avoid having to use a spare wheel.

The document U.S. Pat. No. 5,916,931 presents an aerosol container comprising an aqueous latex emulsion mixed with various products, including fibrous products, and a propellant gas. In the event of a flat tyre, this container is designed to be attached to the valve of the tyre and to send the propellant gas and the sealing/repair emulsion into the internal cavity of the tyre. The tyre is then at least partially reinflated, the emulsion plugs the perforation and it is possible to start running again, first at reduced speed, in order to thoroughly distribute the emulsion over the entire internal surface of the tyre, and then normally.

There also exist repair kits, provided by some motor vehicle manufacturers instead of a spare wheel. This has the advantage of reducing the weight of the car, and thus its fuel consumption, and of freeing space under the floor of the boot.

Repair kits for tyres and aerosol cans are only temporary repairs. It is advisable not to exceed a given speed of the order of 80 km/h and to inspect or quickly change its tyre.

Type manufacturers have also proposed tyres provided, on their interior wall or in their structure, with a layer of elastic, viscous or pasty products, known as "self-sealing products", which make it possible to seal off the perforations. The document WO 2008/080556 A1 presents an example of such a tyre. These tyres are not puncture-proof as such but the perforations are normally reclosed or sealed by the self-sealing product. In comparison with the puncture-combating cans or kits, these tyres equipped with a layer of self-sealing product have the advantage of not requiring that the vehicle be halted. On the other hand, when the perforating objects are excessively large in size or when the perforations are located outside the regions facing the layers of self-sealing products, these tyres do not deal with the problem of punctures.

Tyre manufacturers have also devised the introduction, into the entire combined tyre/wheel, of structural reinforcing elements which allow the tyre to continue to run in the event of a loss in pressure related to a puncture. These reinforcing elements can be placed in the structure of the tyre, as in the document WO 2002/030689 A1 (reference is then made to self-supporting tyre) or can constitute a support, as proposed in the document EP 0 673 324 B1. Self-supporting tyres and supports allow a vehicle equipped with them to continue to run, at least over a limited distance and at reduced speed, whatever the seriousness of the puncture. On the other hand, these solutions are expensive and result, during normal use of the vehicle, in a deterioration in some of the performance factors of the tyres, such as the comfort or the rolling resistance.

BRIEF DESCRIPTION OF THE INVENTION

The subject of the invention is a tyre in the form of a torus open radially on the inside with an inner wall and an outer wall, the said inner wall being at least partially covered with an airtight layer, a crown, two sidewalls and two beads, a crown reinforcement and a carcass reinforcement anchored in the two beads and extending at least from the said beads as far as the crown, characterized in that the said airtight layer is, at least in part, covered with a layer of self-sealing product, and in that, with each bead comprising an annular reinforcing structure, the said annular reinforcing structure comprises several windings of a single metal thread, which windings are arranged axially side by side in several radially superposed layers so as to define a hexagonal cross section.

This choice of annular reinforcing structure has the advantage that, when the beads are mounted on the seats of a rim of geometry H2 as defined by the ETRTO, and with the internal cavity as defined by the inner wall of the tyre and the rim at atmospheric pressure, the beads of the tyre can easily be adapted to withstand running with a transverse acceleration of 0.5 g with no unseating of the beads from the corresponding seats of the rim. This adaptation is achieved by reducing the development of the annular reinforcing structure by a few millimeters in comparison with a conventional structure in order to improve the resistance of the bead to unseating. A person skilled in the art usually makes this adaptation. The advantage of the annular reinforcing structure described is that it allows this resistance to unseating to be improved without penalty to the mounting and demounting of the tyre on and from its rim, on the one hand, and without penalty to the manufacture of the tyre, on the other.

The tyre according to the invention thus combines the presence of a layer of self-sealing product with a bead structure designed to limit the risks of the beads becoming unseated when running at zero inflation pressure or running flat under normal conditions of use.

"Normal" conditions of use mean the conditions of use accessible to non-professional drivers.

This tyre comprises a layer of self-sealing product, that is to say, the very great majority of punctures will have no consequence with regard to the internal inflation pressure, but in the case where this layer does not make it possible to prevent the loss in pressure of the tyre, it has been found that the presence of this layer makes it possible to significantly increase the distance which the tyre can travel when running flat while retaining the possibility of driving the vehicle since the beads remain in place on the seats of the rim. This is because the presence of this layer of self-sealing product makes it possible to delay the damage to the sidewalls of the tyre by a lubricating effect in particular. This tyre thus allows the vehicle, whatever the seriousness of a perforation or puncture, to continue to run for at least several kilometers, which allows it to leave a dangerous area. This is obtained without any deterioration in the performance factors of comfort, of rolling resistance or of behaviour in normal use.

Creating an annular reinforcing structure or bead wire in the way described has the advantage of offering high torsional rigidity, which is highly beneficial in improving the resistance to unseating of the bead of the tyre while maintaining a hexagonal overall shape that makes the tyre easier to produce. By comparison with a braided bead wire, the development of the bead wire can remain within acceptable values to allow the possibility of fitting and removing the tyre onto and from its rim.

For preference, the metal thread used is a rubberized thread with a cross section selected from the group of circular, square, rectangular and hexagonal cross sections.

According to one advantageous particular embodiment, the radially superposed layers are arranged in the 3-4-5-4-3 configuration.

According to another particular embodiment, the radially superposed layers are arranged in the 3-4-3-2 configuration. This embodiment has the advantage of having substantially the same effectiveness as the preceding one while allowing a weight saving.

For preference, the cross section of the metal thread has its largest dimension comprised between 1 and 1.8 mm.

The cross section of the metal thread may be circular with a diameter comprised between 1 and 1.6 mm, and preferably between 1.5 and 1.6 mm.

The cross section of the metal thread may be hexagonal with a side length comprised between 0.7 and 0.9 mm. The benefit of a hexagonal cross section of the thread is that it further enhances the torsional rigidity of the bead wire, something which is highly beneficial in terms of the resistance to unseating of a bead under run flat conditions.

According to one advantageous embodiment of the structure of the sidewall and of the bead of the tyre according to one subject of the invention:
  with the carcass reinforcement comprising a plurality of carcass reinforcing elements, arranged adjacently and circumferentially aligned, anchored in the two beads by a turn-up around the annular reinforcing structure, so as to form within each bead an outward strand and a return strand, each return strand extending radially outwardly as far as an end situated a radial distance DRR from the radially innermost point of the annular reinforcing structure of the bead, the radial distance DRR is greater than or equal to 7% and less than or equal to 30% of the radial height H of the tyre;
  with each bead comprising a rubber compound referred to as filling, the filling being situated radially on the outside of the annular reinforcing structure and at least partially between the outward strand and the return strand of the carcass reinforcement, the filling extending radially on the outside of the radially innermost point of the annular reinforcing structure of the bead as far as a radial distance DRB from the said point, the radial distance DRB is comprised between 20 and 45% of the radial height H of the tyre;
  with each bead further comprising a rubber compound referred to as outer strip positioned axially on the outside of the carcass reinforcement and of the filler, each outer strip extending radially between a radially inner end of the outer strip and a radially outer end of the outer strip, the radially inner end of the outer strip being situated a distance DRI from the radially innermost point of the annular reinforcing structure of the bead, the radial distance DRI is comprised between 1 and 10% of the radial height H of the tyre, the radially outer end of the outer strip being situated a distance DRL from the radially innermost point of the annular reinforcing structure of the bead, the radial distance DRL is comprised between 35 and 50% of the radial height H of the tyre.

According to one advantageous embodiment, with the beads additionally comprising a rubber compound referred to as protector intended to come into contact with a rim seat and extending partially axially on the outside relative to the said outer strip, the assembly formed by the filler, outer strip and protector rubber compounds has a maximum thickness E, measured in any radial plane in a direction perpendicular to the outward strand of the carcass reinforcement with the assembly such that the ratio E/DRL is greater than 15% and preferably greater than 20%.

The bead structure thus described in the preceding two embodiments has the advantage of being very squat, which improves its ability to withstand unseating under transverse acceleration.

Advantageously, the modulus at 10% elongation of the filling, outer strip and protector rubber compounds is comprised between 5 and 15 MPa.

Such a modulus of elongation means that rubber compounds of low hysteresis by comparison with the filling rubber compounds usually used can be employed, offering an advantage in terms of the rolling resistance of the tyre.

According to an alternative embodiment, with the carcass reinforcement comprising a plurality of carcass reinforcing elements arranged adjacently and circumferentially aligned in at least two circumferential alignments, the reinforcing elements of one circumferential alignment being anchored in the two beads by a turn-up around the annular reinforcing structure, so as to form within each bead an outward strand and a return strand, each return strand extending radially outwards as far as an end situated a radial distance DRR from the radially innermost point of the annular reinforcing structure of the bead, the radial distance DRR is greater than or equal to 50% of the radial height H of the tyre.

This structure of sidewalls and beads with two carcass plies has the advantage of being more resistant to shocks caused by potholes.

According to one advantageous embodiment, with each bead comprising a rubber compound referred to as filling and a rubber compound referred to as protector, the filling being situated radially on the outside of the annular reinforcing structure and at least partially between the outward strand and the return strand of the carcass reinforcement, the protector being intended to come into contact with a rim seat, the modulus at 10% elongation of the filling and protector rubber compounds is comprised between 5 and 15 MPa.

As with the preceding embodiment, such a modulus of elongation means that rubber compounds of low hysteresis by comparison with the filling rubber compounds usually used can be employed, this offering an advantage in terms of the rolling resistance of the tyre.

According to one particular embodiment, an additional reinforcing lenticular member is arranged in the region of the sidewalls between the airtight layer and the carcass reinforcement, and this additional reinforcing lenticular member is a rubber compound with a maximum thickness comprised between 0.5 and 10 mm, and preferably between 0.5 and 4 mm.

Such an additional lenticular member enhances the structural support of the tyre and increases the life of the tyre under run flat conditions, but also increases the resistance to unseating of the beads.

For preference, the maximum thickness of the additional lenticular member is comprised between 0.5 and 2.5 mm in order not to penalize the rolling resistance of the tyre. Such an additional lenticular member maximum thickness does not make it possible to avoid there being any contact between the bead and the sidewall of the tyre under run flat conditions, but it does significantly increases the life of this tyre when running with a residual inflation pressure of the order of 0.1 bar for example and also appreciably improves the resistance to unseating of the bead under run flat conditions.

According to a specific embodiment, the layer of self-sealing product is positioned on the airtight layer facing the crown.

Advantageously, the layer of self-sealing product extends over the airtight layer facing at least a portion of the sidewalls.

The self-sealing layer can comprise at least (phr meaning parts by weight per hundred parts of solid elastomer) one thermoplastic styrene ("TPS") elastomer and more than 200 phr of an extending oil for the said elastomer.

The TPS can be the predominant elastomer of the self-sealing layer.

The TPS elastomer can be selected from the group consisting of styrene/butadiene/styrene (SBS), styrene/isoprene/styrene (SIS), styrene/isoprene-/butadiene/styrene (SIBS), styrene/ethylene/butylene/styrene (SEBS), styrene/ethylene/propylene/styrene (SEPS) and styrene/ethylene/ethylene-/propylene/styrene (SEEPS) block copolymers and the mixtures of these copolymers.

Advantageously, the TPS elastomer is selected from the group consisting of SEBS copolymers, SEPS copolymers and the mixtures of these copolymers.

According to another embodiment, the self-sealing layer can comprise at least (phr meaning parts by weight per hundred parts of solid elastomer):
  (a) as predominant elastomer, an unsaturated diene elastomer;
  (b) between 30 and 90 phr of a hydrocarbon resin;
  (c) a liquid plasticizer, the Tg (glass transition temperature) of which is less than −20° C., at a content by weight of between 0 and 60 phr; and
  (d) from 0 to less than 120 phr of a filler.

The unsaturated diene elastomer is advantageously selected from the group consisting of polybutadienes, natural rubber, synthetic polyisoprenes, butadiene copolymers, isoprene copolymers and the mixtures of such elastomers.

The unsaturated diene elastomer can advantageously be an isoprene elastomer, preferably selected from the group consisting of natural rubber, synthetic polyisoprenes and the mixtures of such elastomers.

Advantageously, the content of unsaturated diene elastomer is greater than 50 phr, preferably greater than 70 phr.

A subject-matter of the invention is also an assembly comprising a wheel and a tyre as described above, such that it additionally comprises a device for measuring the inflation pressure of the internal cavity of the wheel and tyre assembly.

With such an assembly, cases of loss of inflation pressure become very rare and, furthermore, in such a case, the loss of pressure is generally very slow. The device for measuring the inflation pressure makes it possible to warn sufficiently soon to repair the tyre or to change it before the inflation pressure becomes too low and thus before any damage to the structure of the tyre.

Such a device can be a pressure sensor attached to the valve of the wheel or to the internal surface of the tyre or also placed in the structure of the tyre.

The invention relates in particular to tyres intended to be fitted to motor vehicles of the passenger vehicle type and to SUVs (sport utility vehicles) and vans.

BRIEF DESCRIPTION OF THE DRAWINGS

The invention and the advantages thereof will be readily understood in the light of the description and embodiments which follow and from the attached figures which in a simple manner and without being drawn to any specific scale, indicate:

FIG. 2 illustrates how the height H of a tyre is determined;

FIG. 3 shows, in radial cross section, a portion of another tyre according to the prior art;

DETAILED DESCRIPTION OF THE INVENTION

In the use of the term "radial", it is advisable to distinguish several different uses of the word by a person skilled in the art. First, the expression refers to a radius of the tyre. It is within this meaning that it is said, of a point P1, that it is "radially interior to" a point P2 (or "radially inside" the point P2) if it is closer to the axis of rotation of the tyre than the point P2. Conversely, a point P3 is said to be "radially exterior to" a point P4 (or "radially outside" the point P4) if it is further from the axis of rotation of the tyre than the point P4. It will be said that a movement is "radially inwards (or outwards)" when the movement is in the direction of the shortest (or longest) radii. When it is a question of radial distances, this meaning of the term also applies.

On the other hand, a thread or a reinforcement is said to be "radial" when the thread or the reinforcing elements of the reinforcement form, with the circumferential direction, an angle of greater than or equal to 80° and less than or equal to 90°. It should be specified that, in the present document, the term "thread" should be understood in an entirely general sense and comprises the threads provided in the form of monofilaments, of multifilaments, of a cord, of folded yarns or of an equivalent assemblage, this being the case whatever the material forming the thread or the surface treatment for promoting the bonding thereof with the rubber blend.

Finally, the term "radial cross section" is understood here to mean a cross section along a plane which comprises the axis of rotation of the tyre.

An "axial" direction is a direction parallel to the axis of rotation of the tyre. A point P5 is said to be "axially interior to" a point P6 (or "axially inside" the point P6) if it is closer to the median plane of the tyre than the point P6. Conversely, a point P7 is said to be "axially exterior to" a point P8 (or "axially outside" the point P8) if it is further from the median plane of the tyre than the point P8. The "median plane" of the tyre is the plane which is perpendicular to the axis of rotation of the tyre and which is located equidistantly from the annular reinforcing structures of each bead.

A "circumferential direction" is a direction which is perpendicular both to a radius of the tyre and to the axial direction.

In this document, two reinforcing elements are said to be "parallel" when the angled formed between the two elements is less than or equal to 20°.

In the context of this document, the expression "rubber blend" denotes a composition formed of rubber comprising at least one elastomer and one filler.

I. Architecture of the Tyres

Figure 1:
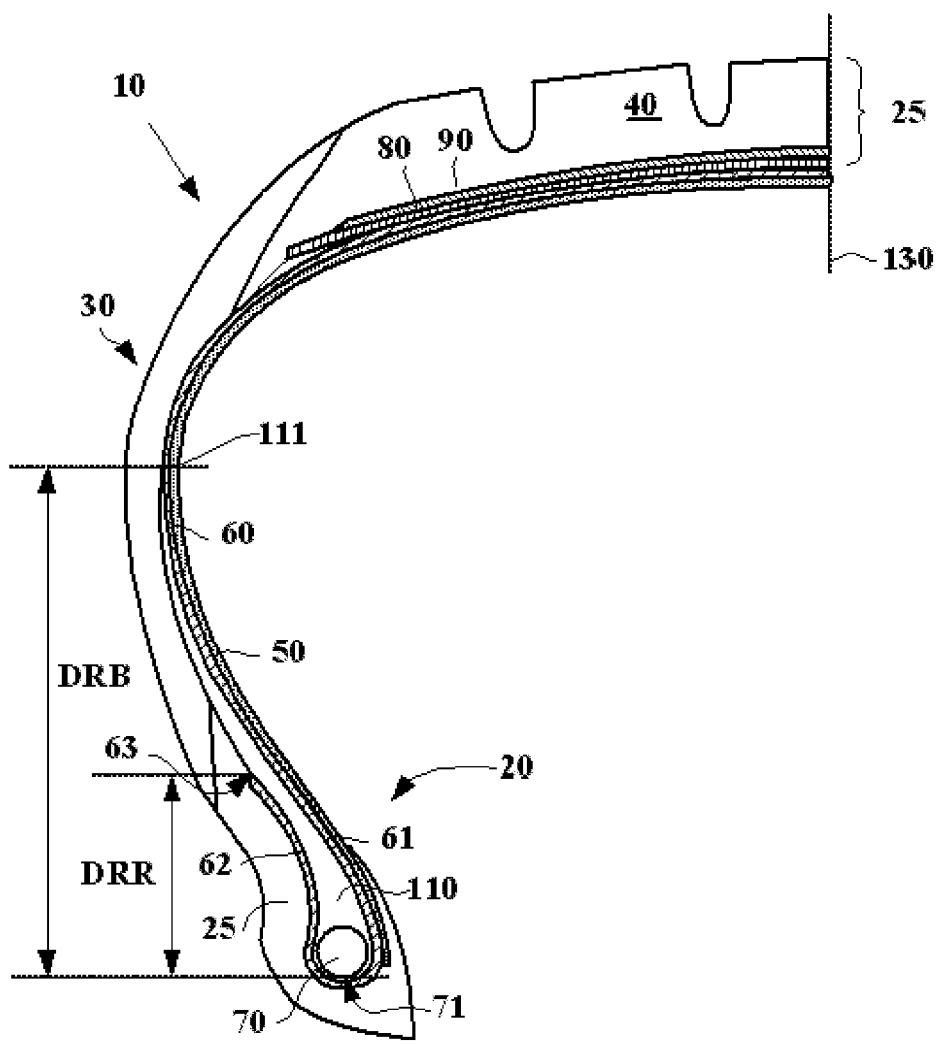
FIG. 1 represents, in radial cross section, one quarter of a tyre according to the prior art.

FIG. 1 diagrammatically represents, in radial cross section, a quarter of a tyre 10 according to the prior art. The tyre 10 comprises two beads 20 intended to come into contact with a mounting rim (not depicted), each bead 20 comprising an annular reinforcing structure, in this instance a bead wire 70. Two sidewalls 30 extend the beads 20 radially outwards and meet in a crown 25 comprising a crown reinforcement formed of a first layer of reinforcements 80 and a second layer of reinforcements 90 and surmounted radially by a tread 40. Each layer of reinforcements comprises threadlike reinforcements, coated in a matrix formed of a rubber blend. The reinforcements in each layer of reinforcements are substantially parallel to one another; the reinforcements of the two layers are crossed from one layer to the other at an angle of around 20°, as is well known to those skilled in the art in the case of tyres known as radial tyres.

The tyre 10 further comprises a carcass reinforcement 60 which extends from the beads 20 through the sidewalls 30 as far as the crown 25. This carcass reinforcement 60 in this instance comprises threadlike reinforcements oriented substantially radially, i.e. making with the circumferential direction an angle greater than or equal to 65° and less than or equal to 90°.

The carcass reinforcement 60 comprises a plurality of carcass reinforcing elements and is anchored in the two beads 20 by being turned up around the bead wire 70 so as to form, within each bead, an outward strand 61 and a return strand 62. The return strand extends radially outwards as far as an end 63 situated a radial distance DRR from the radially innermost point 71 of the annular reinforcing structure of the bead, the radial distance DRR usually being greater than or equal to 15% of the radial height H of the tyre.

The "radial height" H of a tyre is defined as being the radial distance between the radially innermost point 71 of the annular reinforcing structure 70 of the bead 20 and the radially outermost point 41 (FIG. 2) of the tread 40 when the tyre 10 is mounted on a mounting rim 5 (as depicted in FIG. 2) and inflated to its service pressure.

Each bead comprises a filling 110, the filling being situated radially on the outside of the bead wire 70 and, for a good proportion, between the outward strand 61 and the return strand 62 of the carcass reinforcement 60.

The filling 110 extends radially outside the radially innermost point 71 of the annular reinforcing structure of the bead as far as the point 111 situated a radial distance DRB from the point 71, the radial distance DRB usually being greater than or equal to 20% of the radial height H of the tyre. In this particular instance, the filling 110 extends as far as the equator of the tyre. The "equator" of the tyre means, within the context of this document, the radial height of the point of greatest axial extension of the carcass reinforcement. In a radial cross section of the tyre, the equator appears as the axial straight line passing through the points at which the carcass reinforcement has its greatest axial width when the tyre is mounted on the rim and inflated. When the carcass reinforcement reaches this greatest axial width at several points, it is the radial height of the point closest to the mid-height H/2 of the tyre that is considered as being the equator of the tyre. The equator thus defined does not have to coincide with the median plane 130 of the tyre which is also sometimes referred to as the "equator" in documents of the prior art. For preference, DRB is chosen such that the filling does not extend radially outside the equator of the tyre.

The beads 20 also comprise a rubber blend 25 referred to as "protector" which is intended to come into contact with a rim seat. The protector 25 is positioned radially on the inside relative to the annular reinforcing structure 70 and the turn-up of the carcass reinforcement and extends axially on the outside on each side of the outward 61 and return 62 strands of the carcass reinforcement 60.

The annular reinforcing structure or bead wire is, in this instance, a bead wire referred to as braided, which means that it comprises a mild steel core around which one or more thread(s) or cord(s) are wound in one or more layers.

The interior surface of the tyre 10 is covered by an airtight layer or inner liner 50.

It is also known practice to provide an outer strip 120 positioned axially on the outside of the carcass reinforcement and of the filling, as in the tyre represented in FIG. 3, see document WO 2010/072736 A1. Each outer strip extends radially on the outside of a radially inner end 121 situated a radial distance DRI from the radially innermost point 71 of the annular reinforcing structure 70 of the bead, DRI usually being less than or equal to 20% of the radial height H of the tyre, as far as a radially outer end 122, the radial distance DRL between the radially outer end 122 of the outer strip and the radially inner end 121 of the outer strip being greater than or equal to 30% of the radial height H of the tyre.

Figure 4:
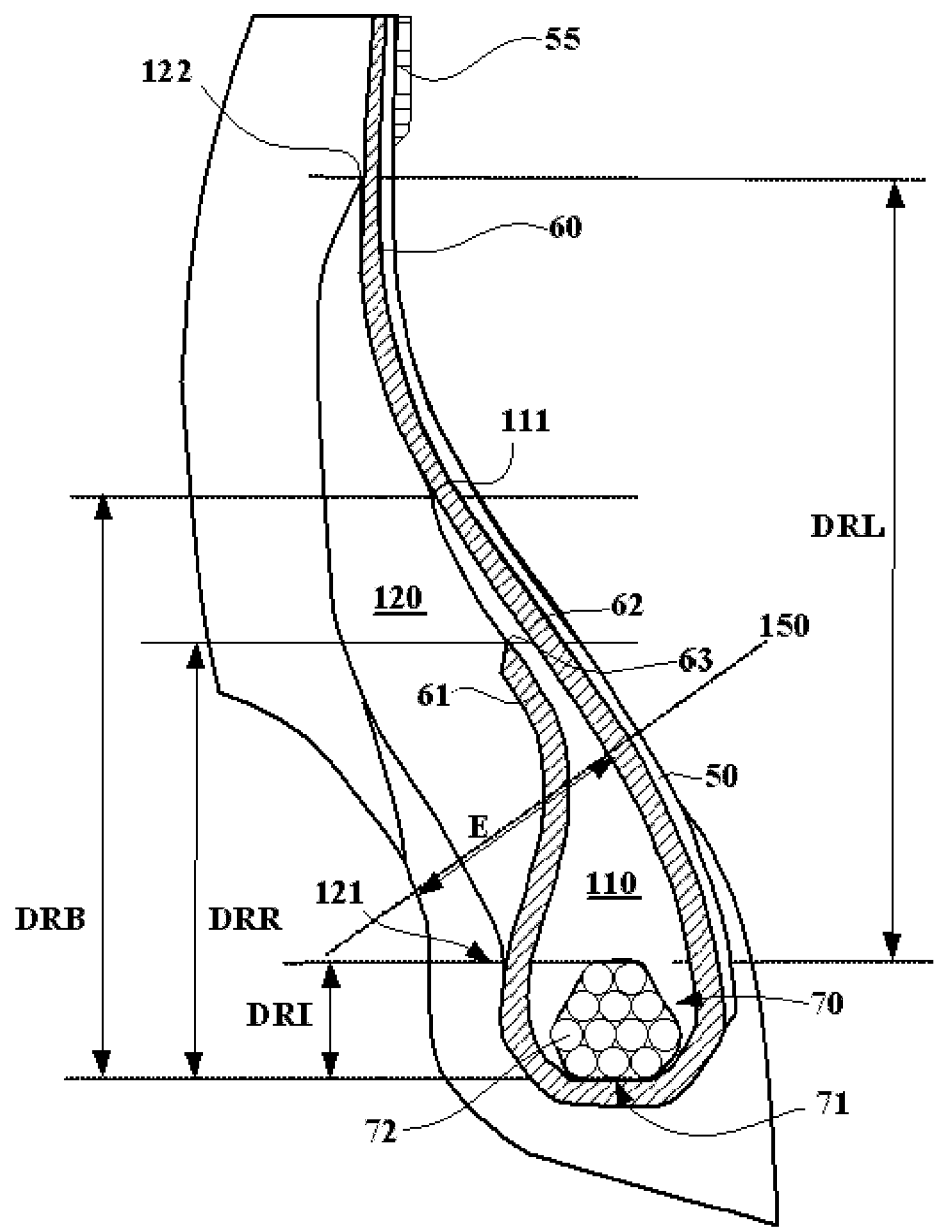
FIG. 4 shows a radial cross section of a first embodiment of a tyre according to one subject matter of the invention.

FIG. 4 shows a first embodiment of the tyre according to one of the subject matters of the invention. This tyre comprises a layer of self-sealing product 55 applied to part of the airtight layer or inner liner 50. In this particular instance, the layer of self-sealing product is positioned facing the crown 25 of the tyre and extends axially over a large proportion of the sidewalls 30. In FIG. 4, only the end of the layer 55 is depicted. This layer of self-sealing product 55 is able to deal with most punctures by plugging them.

Figure 6:
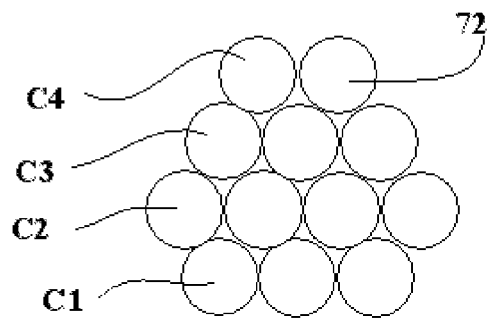
FIG. 6 shows a cross section through a second embodiment of a bead wire.

This tyre also comprises a bead wire 70 formed of several windings of a single metal thread 72 which are arranged axially side by side in several radially superposed layers (C1, C2, C3, C4) so that they define a hexagonal cross section. The assembly of the bead wire of FIG. 4 corresponds to a four-layer construction, working radially from the inside outwards: 3-4-3-2. The layer C1 adjacent to the point 71 comprises 3 windings arranged axially side by side, then the adjacent layer C2 is 4 windings, then C3 has 3 windings and the last layer C4 arranged radially furthest towards the outside comprises two alignments. FIG. 6 corresponds to this construction.

The metal thread has a diameter equal to 1.55 mm. This thread is rubberized (not depicted).

Figure 5:
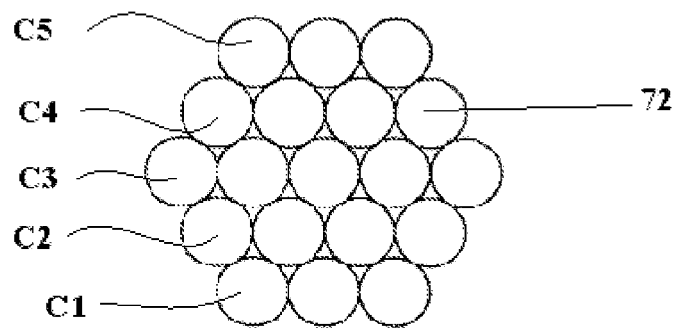
FIG. 5 shows a cross section through a first embodiment of a bead wire.

FIG. 5 shows another example of preferred windings with a 3-4-5-4-3 construction having five layers (C1, C2, C3, C4 and C5). This construction comprises 19 windings and the previous one, 12.

The metal thread 72 may also have a diameter of 1.3 mm. In that case, depending on the sizing of the bead and the loads to be withstood, the number and distribution of circumferential windings needs to be adapted to suit.

Figure 7:
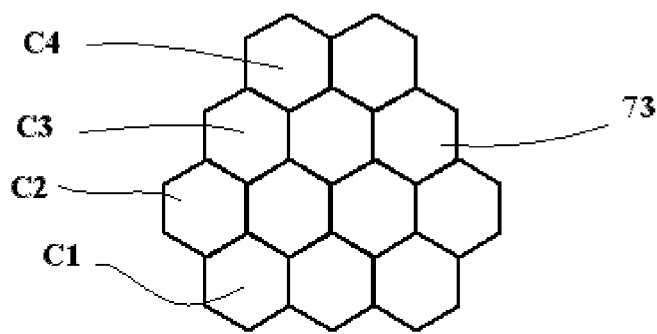
FIG. 7 shows a cross section through a third embodiment of a bead wire.

FIG. 7 shows a cross section of a bead wire of similar construction to that of FIG. 6, having four layers (C1, C2, C3 and C4) but made with a metal thread 73 of hexagonal cross section. The use of this thread improves the torsional rigidity of the bead wire without increasing the mass thereof.

The structure of the bead of this tyre (FIG. 4) is similar to that of FIG. 3 with just one carcass ply 60, a carcass ply turn-up, the return strands 62 of which extend radially outwards as far as an end 63 situated a radial distance DRR from the radially innermost point 71 of the bead wire 70. The radial distance DRR is greater than or equal to 7% and less than or equal to 30% of the radial height H of the tyre. The bead also comprises a filling 110 which extends radially outwards as far as a radial distance DRB from the point 71. The radial distance DRB is comprised between 20 and 45% of the radial height H of the tyre. The bead also comprises an outer strip 120 of which the radially inner end 121 is situated a radial distance DRI from the point 71, DRI being comprised between 1 and 10% of the radial height H. The radial extent DRL, which is the radial distance between the two ends 121 and 122, is comprised between 35 and 50% of the radial height H of the tyre.

The bead also comprises a rubber compound referred to as protector 25 intended to come into contact with a rim seat. This protector extends in part axially on the outside relative to the outer strip 120.

The assembly formed by the filling, outer strip and protector rubber compounds has a maximum thickness E, measured in any radial plane in a direction 150 perpendicular to the outward strand 61 of the carcass reinforcement. This maximum thickness E is such that the ratio E/DRL is greater than 15% and preferably greater than 20%. In the instance shown, this ratio is of the order of 28%.

This high form factor D/DRL shows that the structure of the bead is very squat and this, coupled with the torsionally very rigid nature of the annular reinforcing structure means that the tyre can be given excellent resistance to the unseating of these beads under run flat conditions.

For preference, the above rubber blends have a modulus at 10% elongation comprised between 5 and 15 MPa. These relatively low values mean that compounds of low hysteresis can be used, offering an advantage in terms of the rolling resistance of the tyre.

What is meant by a modulus at 10% elongation is a secant modulus in extension at 10% deformation and at ambient temperature (23° C.), the measurement being taken after an initial accommodation cycle up to 10% deformation.

Figure 8:
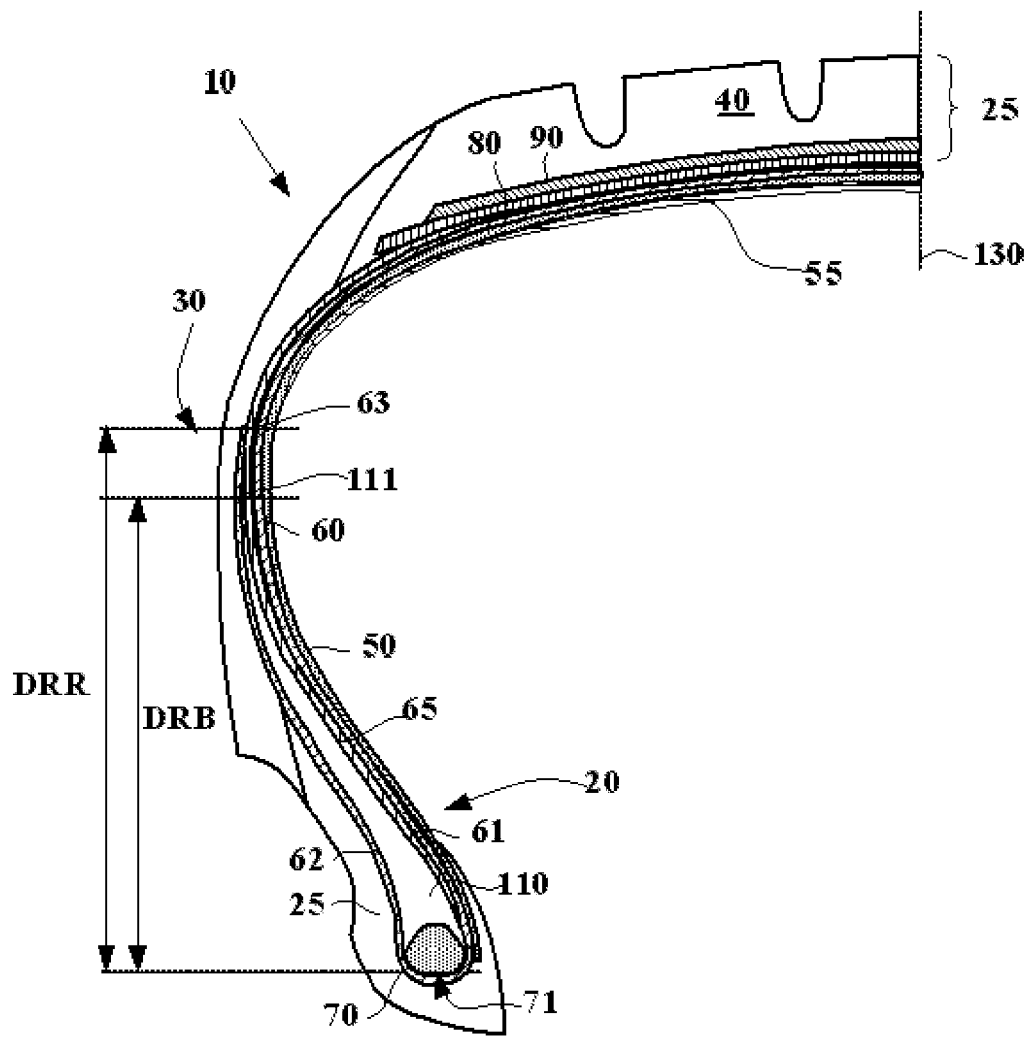
FIG. 8 shows a radial cross section of a second embodiment of a tyre according to one subject matter of the invention.

FIG. 8 shows an alternative embodiment of a tyre according to one of the subject matters of the invention.

A layer of self-sealing product 55 is applied to part of the inner liner 50. In this particular instance, the layer of self-sealing product is positioned facing the crown 25 of the tyre and extends axially as far as the sidewalls 30 of the tyre.

The carcass reinforcement comprises a first circumferential alignment of reinforcers 60 or first carcass ply, anchored in the bead 20 by being turned up around the bead wire 70, and a second circumferential alignment of reinforcers or second carcass ply 65. This second carcass ply 65 extends substantially between the annular reinforcing structure 70 and the crown. There are two half-carcasses. The benefit of this is that it increases the resistance of the tyre to shocks caused by potholes or pinching.

The structure of the bead 20 as before comprises a bead wire 70 formed of several windings of a single metal thread 72 which are arranged axially side by side in several radially superposed layers so as to define a hexagonal cross section. FIG. 5 show preferred winding structures for this embodiment.

The return strands 62 extend radially outwards as far as an end 63 situated a radial distance DRR from the radially innermost point 71 of the annular reinforcing structure of the bead, the radial distance DRR being greater than or equal to 50% of the radial height H of the tyre. This very high value of the radial distance DRR, combined with the high torsional rigidity of the bead wire 70 makes it possible to obtain excellent resistance of this tyre to unseating under run flat conditions.

The bead 20 also comprises a rubber compound referred to as protector 25 and, as before, the moduli of the filling and of the protector at 10% elongation are comprised between 5 and 15 MPa.

That offers an advantage in terms of the rolling resistance of the tyre.

II. Layer of Self-Sealing Product

In what follows, unless expressly indicated otherwise, all the percentages (%) indicated are % by weight.

Moreover, any interval of values denoted by the expression "between a and b" represents the range of values greater than "a" and less than "b" (that is to say, limits a and b excluded), while any interval of values denoted by the expression "from a to b" means the range of values extending from "a" up to "b" (that is to say, including the strict limits a and b).

The abbreviation "phr" means parts by weight per hundred parts of elastomer in the solid state (of the total of the solid elastomers, if several solid elastomers are present).

The expression composition "based on" should be understood as meaning, generally, a composition comprising the mixture and/or the reaction product of its various components, it being possible for some of these components to be capable of reacting (indeed even intended to react) with one another, at least in part, during the various phases of manufacture of the composition, for example during its optional final crosslinking or vulcanization (curing).

II-1. Layer of Self-Sealing Product Based on a Thermoplastic Styrene Elastomer

According to one embodiment, the self-sealing layer 55 comprises a thermoplastic styrene ("TPS") elastomer and more than 200 phr of an extending oil for the elastomer. Thermoplastic styrene elastomers are thermoplastic elastomers provided in the form of styrene-based block copolymers.

Intermediate in structure between thermoplastic polymers and elastomers, they are composed, in a known way, of rigid polystyrene sequences connected by flexible elastomer sequences, for example polybutadiene, polyisoprene or poly (ethylene/butylene). These are often triblock elastomers with two rigid segments connected by a flexible segment. The rigid and flexible segments can be positioned linearly, in star-branched fashion or in branched fashion.

The TPS elastomer is selected from the group consisting of styrene/butadiene/styrene (SBS), styrene/isoprene/styrene (SIS), styrene/isoprene/butadiene/styrene (SIBS), styrene/ethylene/butylene/styrene (SEBS), styrene/ethylene/propylene/styrene (SEPS) and styrene/ethylene/ethylene/propylene/styrene (SEEPS) block copolymers and the mixtures of these copolymers.

More preferably, the elastomer is selected from the group consisting of SEBS copolymers, SEPS copolymers and the mixtures of these copolymers.

The TPS elastomer can constitute all of the elastomer matrix or the majority by weight (preferably for more than 50%, more preferably for more than 70%) of the latter, when it comprises one or more other thermoplastic or nonthermoplastic elastomer(s), for example of the diene type.

Examples of such self-sealing layers and their properties are disclosed in the documents FR 2 910 382, FR 2 910 478 and FR 2 925 388.

Such a self-sealing layer can be preformed by extrusion of a flat profiled element at the appropriate dimensions for the application thereof on a manufacturing drum. An implementational example is presented in the document FR 2 925 388.

II-2. Layer of Self-Sealing Product Based on Diene Elastomer

According to another implementational example, the self-sealing layer 55 product is composed of an elastomer composition comprising at least, as predominant elastomer (preferably for more than 50 phr), an unsaturated diene elastomer, between 30 and 90 phr of a hydrocarbon resin and a liquid plasticizer with a glass transition temperature or Tg of less than −20° C., at a content of between 0 and 60 phr (phr meaning parts by weight per hundred parts of solid elastomer). It has the other essential characteristic of being devoid of filler or of comprising less than 120 phr thereof.

Diene Elastomer

"Diene" elastomer or rubber, to remind the reader, should be understood, in a known way, as being an elastomer resulting at least in part (i.e., a homopolymer or a copolymer) from diene monomers (monomers carrying two conjugated or nonconjugated carbon-carbon double bonds).

These diene elastomers can be classified into two categories, saturated or unsaturated. In the present patent application, "unsaturated" (or "essentially unsaturated") diene elastomer is understood to mean a diene elastomer resulting at least in part from conjugated diene monomers and having a content of units resulting from conjugated dienes which is greater than 30% (mol %); thus it is that diene elastomers, such as butyl rubbers or copolymers of dienes and of α-olefins of EPDM type, which can be described as "saturated" or "essentially saturated" diene elastomers due to their reduced content of units of diene origin (always less than 15 mol %), are excluded from this definition.

Use is preferably made of an unsaturated diene elastomer having a content (mol %) of units of diene origin (conjugated dienes) of greater than 50%, such a diene elastomer being more preferably selected from the group consisting of polybutadienes (BRs), natural rubber (NR), synthetic polyisoprenes (IRs), butadiene copolymers (for example, butadiene/styrene copolymers or SBRs), isoprene copolymers (of course, other than butyl rubber) and the mixtures of such elastomers.

In contrast to diene elastomers of the liquid type, the unsaturated diene elastomer of the composition is by definition solid. Preferably, its number-average molecular weight (Mn) is between 100 000 and 5 000 000 g/mol, more particularly between 200 000 and 4 000 000 g/mol. The Mn value is determined in a known way, for example by SEC: solvent tetrahydrofuran; temperature 35° C.; concentration 1 g/l; flow rate 1 ml/min; solution filtered through a filter with a porosity of 0.45 μm before injection; Moore calibration with standards (polyisoprene); set of 4 "WATERS" columns in series ("STYRAGEL" HMW7, HMW6E and 2 HT6E); detection by differential refractometer ("WATERS 2410") and its associated operating software ("WATERS EMPOWER").

More preferably, the unsaturated diene elastomer of the composition of the self-sealing layer is an isoprene elastomer. The term "isoprene elastomer" is understood to mean, in a known way, an isoprene homopolymer or copolymer, in other words a diene elastomer selected from the group consisting of natural rubber (NR), synthetic polyisoprenes (IRs), butadiene/isoprene copolymers (BIRs), styrene/isoprene copolymers (SIRs), styrene/butadiene/isoprene copolymers (SBIRs) and the mixtures of these elastomers.

This isoprene elastomer is preferably natural rubber or a synthetic cis-1,4-polyisoprene; use is preferably made, among these synthetic polyisoprenes, of polyisoprenes having a content (mol %) of cis-1,4-bonds of greater than 90%, more preferably still of greater than 95%, in particular greater than 98%.

The unsaturated diene elastomer above, in particular isoprene elastomer, such as natural rubber, can constitute all of the elastomer matrix or the majority by weight (preferably for more than 50%, more preferably for more than 70%) of the latter when it comprises one or more other diene or nondiene elastomer(s), for example of the thermoplastic type. In other words and preferably, in the composition, the content of (solid) unsaturated diene elastomer, in particular of isoprene elastomer, such as natural rubber, is greater than 50 phr, more preferably greater than 70 phr. More preferably still, this content of unsaturated diene elastomer, in particular of isoprene elastomer, such as natural rubber, is greater than 80 phr.

According to a specific embodiment, the layer of self-sealing product comprises, preferably as predominant elastomer, a blend (or "mixture") of at least two solid elastomers:

at least one (that is to say, one or more) polybutadiene or butadiene copolymer, referred to as "elastomer A", and
at least one (that is to say, one or more) natural rubber or synthetic polyisoprene, referred to as "elastomer B".

Mention may in particular be made, as polybutadienes, of those having a content of 1,2-units of between 4% and 80% or those having a content of cis-1,4-units of greater than 80%. Mention may in particular be made, as butadiene copolymers, of butadiene/styrene copolymers (SBRs), butadiene/isoprene copolymers (BIRs) or styrene/butadiene/isoprene copolymers (SBIRs). The SBR copolymers having a styrene content of between 5% and 50% by weight and more particularly between 20% and 40%, a content of 1,2-bonds on the butadiene part of between 4% and 65% and a content of trans-1,4-bonds of between 20% and 80%, the BIR copolymers having a isoprene content of between 5% and 90% by weight and a Tg of −40° C. to −80° C., and the SBIR copolymers having a styrene content of between 5% and 50% by weight and more particularly of between 10% and 40%, an isoprene content of between 15% and 60% by weight and more particularly between 20% and 50%, a butadiene content of between 5% and 50% by weight and more particularly of between 20% and 40%, a content of 1,2-units of the butadiene part of between 4% and 85%, a content of trans-1,4-units of the butadiene part of between 6% and 80%, a content of 1,2-plus 3,4-units of the isoprene part of between 5% and 70% and a content of trans-1,4-units of the isoprene part of between 10% and 50%, and more generally any SBIR copolymer having a Tg of between −20° C. and −70° C., are suitable in particular.

More preferably still, the elastomer A is a butadiene homopolymer, in other words a polybutadiene (BR), this polybutadiene preferably having a content (mol %) of cis-1,4-bonds of greater 90%, more preferably of greater than 95%.

The elastomer B is natural rubber or a synthetic polyisoprene; use is preferably made, among synthetic polyisoprenes, of cis-1,4-polyisoprenes, preferably those having a content (mol %) of cis-1,4-bonds of greater than 90%, more preferably still of greater than 95%, in particular of greater than 98%.

The above elastomers A and B can, for example, be block, random, sequential or microsequential elastomers and can be prepared in dispersion or in solution; they can be coupled and/or star-branched and/or branched or also functionalized, for example with a coupling and/or star-branching or functionalization agent. For coupling with carbon black, mention may be made, for example, of functional groups comprising a C—Sn bond or of aminated functional groups, such as benzophenone, for example; for coupling with a reinforcing inorganic filler, such as silica, mention may be made, for example, of silanol functional groups or polysiloxane functional groups having a silanol end (such as described, for example, in U.S. Pat. No. 6,013,718), of alkoxysilane groups (such as described, for example, in U.S. Pat. No. 5,977,238), of carboxyl groups (such as described, for example, in U.S. Pat. No. 6,815,473 or US 2006/0089445) or also of polyether groups (such as described, for example, in U.S. Pat. No. 6,503,973). Mention may also be made, as other examples of such functionalized elastomers, of elastomers (such as SBR, BR, NR or IR) of the epoxidized type.

According to a preferred embodiment, the elastomer A:elastomer B ratio by weight is preferably within a range from 20:80 to 80:20, more preferably still within a range from 30:70 to 70:30, in particular from 40:60 to 60:40.

It is in such respective concentration ranges of the two elastomers A and B that the best compromises in terms of self-sealing properties and operating temperature have been observed, according to the different specific uses targeted, in particular during use at low temperature (in particular at a temperature of less than 0° C.), in comparison with the use of natural rubber alone or of polybutadiene alone.

Elastomers A and B are by definition solid. In contrast to liquid, the term "solid" is understood to mean any substance not having the ability to eventually assume, at the latest after 24 hours, solely under the effect of gravity and at ambient temperature (23° C.), the shape of the container in which it is present.

In contrast to elastomers of the liquid type which can optionally be used as liquid plasticizers in the composition of the invention, the elastomers A and B and their blend are characterized by a very high viscosity: their Mooney viscosity in the raw state (i.e., noncrosslinked state) ML (1+4), measured at 100° C., is preferably greater than 20, more preferably greater than 30, in particular between 30 and 130.

As a reminder, the Mooney viscosity or plasticity characterizes, in a known way, solid substances. Use is made of an oscillating consistometer as described in Standard ASTM D1646 (1999). The Mooney plasticity measurement is carried out according to the following principle: the sample, analyzed in the raw state (i.e., before curing), is moulded (formed) in a cylindrical chamber heated to a given temperature (for example, 35° C. or 100° C.). After preheating for one minute, the rotor rotates within the test specimen at 2 revolutions/minute and the working torque for maintaining this movement is measured after rotating for 4 minutes. The Mooney viscosity (ML 1+4) is expressed in "Mooney unit" (MU, with 1 MU=0.83 newton·meter).

According to another possible definition, solid elastomer is also understood to mean an elastomer having a high molar mass, that is to say typically exhibiting a number-average molar mass (Mn) which is greater than 100 000 g/mol; preferably, in such a solid elastomer, at least 80%, more preferably at least 90%, of the area of the distribution of the molar masses (measured by SEC) is situated above 100 000 g/mol.

Preferably, the number-average molar mass (Mn) of each of the elastomers A and B is between 100 000 and 5 000 000 g/mol, more preferably between 150 000 and 4 000 000 g/mol; in particular, it is between 200 000 and 3 000 000 g/mol, more particularly between 200 000 and 1 500 000 g/mol. Preferably, their polydispersity index PI (Mw/Mn) is between 1.0 and 10.0, in particular between 1.0 and 3.0 as regards the elastomer A and between 3.0 and 8.0 as regards the elastomer B.

A person skilled in the art will know how to adjust, in the light of the present description and as a function of the specific application targeted for the composition of the invention, the average molar mass and/or the distribution of the molar masses of the elastomers A and B. According to a specific embodiment of the invention, he can, for example, opt for a broad distribution of molar masses. If he wishes to favour the fluidity of the self-sealing composition, he can instead favour the proportion of low molar masses. According to another specific embodiment, which may or may not be combined with the preceding embodiment, he can also favour the proportion of intermediate molar masses for the purpose of instead optimizing the self-sealing (filling) role of the composition. According to another specific embodiment, he can instead favour the proportion of high molar masses for the purpose of increasing the mechanical strength of the self-sealing composition.

These various molar mass distributions can be obtained, for example, by compounding different starting diene elastomers (elastomers A and/or elastomers B).

According to a preferred embodiment of the self-sealing layer, the above blend of solid elastomers A and B constitutes the only solid elastomer present in the self-sealing composition of the invention, that is to say that the overall content of the two elastomers A and B is then 100 phr; in other words, the contents of elastomer A and elastomer B are consequently each within a range from 10 to 90 phr, preferably from 20 to 80 phr, more preferably from 30 to 70 phr, in particular from 40 to 60 phr.

According to another specific embodiment of the layer of self-sealing product, when the blend of elastomers A and B does not constitute the only solid elastomer of the composition of the invention, the said blend preferably constitutes the predominant solid elastomer by weight in the composition of the invention; more preferably, the overall content of the two elastomers A and B is then greater than 50 phr, more preferably greater than 70 phr, in particular greater than 80 phr.

Thus, according to specific embodiments of the invention, the blend of elastomers A and B might be combined with other (solid) elastomers which are minor components by weight, whether unsaturated or saturated diene elastomers (for example butyl elastomers) or also elastomers other than diene elastomers, for example thermoplastic styrene ("TPS") elastomers, for example selected from the group consisting of styrene/butadiene/styrene (SBS), styrene/isoprene/styrene (SIS), styrene/butadiene/isoprene/styrene (SBIS), styrene/isobutylene/styrene (SIBS), styrene/ethylene/butylene/styrene (SEBS), styrene/ethylene/propylene/styrene (SEPS) and styrene/ethylene/ethylene/propylene/styrene (SEEPS) block copolymers and the mixtures of these copolymers.

Surprisingly, the above blend of elastomers A and B, which is devoid of filler (or with a very low content of filler), has proved to be capable, after addition of a thermoplastic hydrocarbon resin within the recommended narrow range, of fulfilling the function of an effective self-sealing composition.

Hydrocarbon Resin

The second essential constituent of the self-sealing composition according to this second embodiment is a hydrocarbon resin.

The designation "resin" is reserved in the present patent application, by definition known to a person skilled in the art, for a compound which is solid at ambient temperature (23° C.), in contrast to a liquid plasticizing compound, such as an oil.

Hydrocarbon resins are polymers well known to a person skilled in the art, essentially based on carbon and hydrogen, which can be used in particular as plasticizing agents or tackifying agents in polymer matrices. They are by nature miscible (i.e., compatible) at the contents used with the polymer compositions for which they are intended, so as to act as true diluents. They have been described, for example, in the work entitled "*Hydrocarbon Resins*" by R. Mildenberg, M. Zander and G. Collin (New York, VCH, 1997, ISBN 3-527-28617-9), Chapter 5 of which is devoted to their applications, in particular in the tyre rubber field (5.5. "*Rubber Tires and Mechanical Goods*"). They can be aliphatic, cycloaliphatic, aromatic, hydrogenated aromatic, of the aliphatic/aromatic type, that is to say based on aliphatic and/or aromatic monomers. They can be natural or synthetic and may or may not be based on oil (if such is the case, they are also known under the name of petroleum resins). Their glass transition temperature (Tg) is preferably greater than 0° C., in particular greater than 20° C. (generally between 30° C. and 95° C.).

In a known way, these hydrocarbon resins can also be described as thermoplastic resins in the sense that they soften on heating and can thus be moulded. They can also be defined by a softening point or temperature, at which temperature the product, for example in the powder form, sticks together; this datum tends to replace the melting point, which is rather poorly defined, for resins in general. The softening temperature of a hydrocarbon resin is generally greater by approximately 50 to 60° C. than its Tg value.

In the composition of the self-sealing layer, the softening temperature of the resin is preferably greater than 40° C. (in particular between 40° C. and 140° C.), more preferably greater than 50° C. (in particular between 50° C. and 135° C.).

The said resin is used at a content by weight of between 30 and 90 phr. Below 30 phr, the puncture-resistant performance has proved to be inadequate due to an excessively high stiffness of the composition, whereas, above 90 phr, exposure to an inadequate mechanical strength of the material exists with in addition a risk of a damaged performance at high temperature (typically greater than 60° C.). For these reasons, the content of resin is preferably between 40 and 80 phr, more preferably still at least equal to 45 phr, in particular within a range from 45 to 75 phr.

According to a preferred embodiment of the self-sealing layer, the hydrocarbon resin exhibits at least (any) one, more preferably all, of the following characteristics:
- a Tg of greater than 25° C.;
- a softening point of greater than 50° C. (in particular of between 50° C. and 135° C.);
- a number-average molecular weight (Mn) of between 400 and 2000 g/mol;
- a polydispersity index (PI) of less than 3 (as a reminder: PI=Mw/Mn with Mw the weight-average molecular weight).

More preferably, this hydrocarbon resin exhibits at least (any) one, more preferably all, of the following characteristics:
- a Tg of between 25° C. and 100° C. (in particular between 30° C. and 90° C.);
- a softening point of greater than 60° C., in particular of between 60° C. and 135° C.;
- a number-average molecular weight Mn of between 500 and 1500 g/mol;
- a polydispersity index PI of less than 2.

The Tg is measured according Standard ASTM D3418 (1999). The softening point is measured according to Standard ISO 4625 (Ring and Ball method). The macrostructure (Mw, Mn and PI) is determined by steric exclusion chromatography (SEC): solvent tetrahydrofuran; temperature 35° C.; concentration 1 g/l; flow rate 1 ml/min; solution filtered through a filter with a porosity of 0.45 µm before injection; Moore calibration with polystyrene standards; set of 3 "WATERS" columns in series ("STYRAGEL" HR4E, HR1 and HR0.5); detection by differential refractometer ("Waters" 2410) and its associated operating software ("WATERS EMPOWER").

Mention may be made, as examples of such hydrocarbon resins, of those selected from the group consisting of cyclopentadiene (abbreviated to CPD) or dicyclopentadiene (abbreviated to DCPD) homopolymer or copolymer resins, terpene homopolymer or copolymer resins, C5 fraction homopolymer or copolymer resins, and the mixtures of these resins. Mention may more particularly be made, among the above copolymer resins, of those selected from the group consisting of (D)CPD/vinylaromatic copolymer resins, (D)CPD/terpene copolymer resins, (D)CPD/C5 fraction copolymer resins, terpene/vinylaromatic copolymer resins, C5 fraction/vinylaromatic copolymer resins, and the mixtures of these resins.

The term "terpene" combines here, in a known way, α-pinene, β-pinene and limonene monomers; use is preferably made of a limonene monomer, a compound which exists, in a known way, in the form of three possible isomers: L-limonene (laevorotatory enantiomer), D-limonene (dextrorotatory enantiomer) or else dipentene, the racemate of the dextrorotatory and laevorotatory enantiomers. Suitable as vinylaromatic monomer are, for example, styrene, α-methylstyrene, ortho-methylstyrene, meta-methylstyrene, para-methylstyrene, vinyltoluene, para-(tert-butyl)styrene, methoxystyrenes, chlorostyrenes, hydroxystyrenes, vinylmesitylene, divinylbenzene, vinylnaphthalene or any vinylaromatic monomer resulting from a C9 fraction (or more generally from a C8 to 010 fraction).

More particularly, mention may be made of the resins selected from the group consisting of (D)CPD homopolymer resins, (D)CPD/styrene copolymer resins, polylimonene resins, limonene/styrene copolymer resins, limonene/D(CPD) copolymer resins, C5 fraction/styrene copolymer resins, C5 fraction/C9 fraction copolymer resins, and the mixtures of these resins.

All the above resins are well known to a person skilled in the art and are commercially available, for example sold by DRT under the name "Dercolyte" as regards the polylimonene resins, by Neville Chemical Company under the name "Super Nevtac" or by Kolon under the name "Hikorez" as regards the C5 fraction/styrene resins or C5 fraction/C9 fraction resins, or by Struktol under the name "40 MS" or "40 NS" or by Exxon Mobil under the name "Escorez" (mixtures of aromatic and/or aliphatic resins).

Filler

The composition of the self-sealing layer according to this second embodiment has the other essential characteristic of comprising from 0 to less than 120 phr of at least one (that is to say one or more) filler, including from 0 to less than 30 phr of at least one (that is to say, one or more) reinforcing filler.

Filler is understood here to mean any type of filler, whether reinforcing (typically having nanometric particles, preferably with a weight-average size of less than 500 nm, in particular between 20 and 200 nm) or nonreinforcing or inert (typically having micrometric particles, preferably with a weight-average size of greater than 1 µm, for example between 2 and 200 µm), the weight-average size being measured in a way well known to a person skilled in the art (by way of example, according to Application WO2009/083160, section 1.1).

Mention will in particular be made, as examples of fillers known as reinforcing to a person skilled in the art, of carbon black or of a reinforcing inorganic filler, such as silica in the presence of a coupling agent, or a blend of these two types of filler. This is because, in a known way, silica is a reinforcing filler in the presence of a coupling agent which allows it to bond to the elastomer.

All carbon blacks are suitable as carbon blacks, for example, in particular the blacks conventionally used in tyres. Mention will be made, for example, among the latter, of carbon blacks of 300, 600, 700 or 900 grade (ASTM) (for example, N326, N330, N347, N375, N683, N772 or N990). Suitable in particular as reinforcing inorganic fillers are highly dispersible mineral fillers of the silica (SiO2) type, in particular precipitated or fumed silicas exhibiting a BET specific surface of less than 450 m2/g, preferably from 30 to 400 m2/g.

Mention will in particular be made, as examples of fillers other than reinforcing fillers, or inert fillers, known to a person skilled in the art, of those selected from the group consisting of ashes (i.e., combustion residues), microparticles of natural calcium carbonates (chalk) or synthetic calcium carbonates, synthetic or natural silicates (such as kaolin, talc, mica, cloisite), silicas (in the absence of coupling agent), titanium oxides, aluminas, aluminosilicates (clay, bentonite), and their mixtures. Colouring fillers or fillers coloured, for example, by pigments can advantageously be used to colour the composition according to the colour desired. Preferably, the composition of the invention comprises a filler other than a reinforcing filler selected from the group consisting of chalk, talc, kaolin and their mixtures.

The physical state under which the filler is provided is not important, whether in the form of a power, microspheres, granules, beads or any other appropriate densified form. Of course, filler is also understood to mean mixtures of different reinforcing and/or nonreinforcing fillers.

These reinforcing or other fillers are usually present to give dimensional stability, that is to say a minimum mechanical strength, to the final composition. Less thereof is preferably placed in the composition in proportion as the filler is known to be reinforcing with respect to an elastomer, in particular a diene elastomer, such as natural rubber or polybutadiene.

A person skilled in the art will be able, in the light of the present description, to adjust the content of filler of the composition of the invention in order to achieve the property levels desired and to adjust the formulation to the specific application envisaged. Preferably, the composition of the invention comprises from 0 to less than 100 phr of filler, preferably from 0 to less than 70 phr of filler, including from 0 to less than 15 phr of reinforcing filler, preferably from 0 to less than 10 phr of reinforcing filler.

More preferably still, the composition of the invention comprises from 0 to 70 phr of filler, including from 0 to less than 5 phr of reinforcing filler. Very preferably, the composition of the invention comprises a filler other than a reinforcing filler at a content which can range from 5 to 70 phr, preferably from 10 to 30 phr.

According to the application envisaged, the invention can in particular come in two embodiments, according to the content of filler. This is because an excessively high amount of filler is damaging to the required properties of flexibility, deformability and ability to creep, while the presence of a certain amount of filler (for example from 30 to less than 120 phr) makes it possible to improve the processability and to reduce the cost.

Thus, according to a first specific embodiment, the composition has a very low content of filler, that is to say that it comprises from 0 to less than 30 phr of filler in total (including from 0 to less than 30 phr of reinforcing filler), preferably from 0 to less than 30 phr of filler, including from 0 to less than 15 phr of reinforcing filler (more preferably from 0 to less than 10 phr of reinforcing filler). According to this first embodiment, this composition has the advantage of making possible a self-sealing composition having good puncture-resistant properties under cold conditions and under hot conditions.

More preferably, according to this first specific embodiment, if a reinforcing filler is present in the composition of the invention, its content is preferably less than 5 phr (i.e., between 0 and 5 phr), in particular less than 2 phr (i.e., between 0 and 2 phr). Such contents have proved to be particularly favourable to the process for the manufacture of the composition of the invention, while giving the latter an excellent self-sealing performance. Use is more preferably made of a content of between 0.5 and 2 phr, in particular when carbon black is concerned.

Preferably again, according to this first specific embodiment, if a filler other than a reinforcing filler is used, its content is preferably from 5 to less than 30 phr, in particular from 10 to less than 30 phr.

Furthermore, according to a second specific embodiment, which is preferred, the composition comprises from 30 to less than 120 phr of filler, preferably from more than 30 to less than 100 phr and more preferably from 35 to 80 phr, including, according to this second embodiment, from 0 to less than 30 phr of reinforcing filler (more preferably from 0 to less than 15 phr). According to this second specific embodiment, this composition has the advantage of improving the processability and of reducing the cost while not being excessively damaged with regard to its properties of flexibility, deformability and ability to creep. Furthermore, this second embodiment confers, on the composition, a markedly improved puncture-resistant performance.

Preferably, according to this second specific embodiment, if a reinforcing filler is present in the composition of the invention, its content is preferably less than 5 phr (i.e., between 0 and 5 phr), in particular less than 2 phr (i.e., between 0 and 2 phr). Such contents have proved to be particularly favourable to the process for the manufacture of the composition of the invention, while giving the latter an excellent self-sealing performance. Use is more preferably made of a content of between 0.5 and 2 phr, in particular when carbon black is concerned.

Preferably, according to this second specific embodiment, the content of filler other than reinforcing filler is from 5 to less than 120 phr, in particular from 10 to less than 100 phr and more preferably from 15 to 80 phr. Very preferably, the content of filler other than a reinforcing filler is within a range extending from 25 to 50 phr, more preferably still from 30 to 50 phr.

Liquid Plasticizer

The composition of the layer of self-sealing product according to the second embodiment can additionally comprise, at a content of less than 60 phr (in other words, between 0 and 60 phr), a liquid plasticizing agent (liquid at 23° C.), referred to as "low Tg" plasticizing agent, the role of which is in particular to soften the matrix by diluting the diene elastomer and the hydrocarbon resin, improving in particular the "cold" self-sealing performance (that is to say, typically for a temperature of less than 0° C.); its Tg is by definition less than −20° C. and is preferably less than −40° C.

Any liquid elastomer or any extending oil, whether of aromatic or nonaromatic nature, more generally any liquid plasticizing agent known for its plasticizing properties with respect to elastomers, in particular diene elastomers, can be used. At ambient temperature (23° C.), these plasticizers or these oils, which are more or less viscous, are liquids (that is to say, as a reminder, substances having the ability to eventually assume the shape of their container), in contrast in particular to hydrocarbon resins which are by nature solid at ambient temperature.

Suitable in particular are liquid elastomers having a low number-average molecular weight (Mn), typically of between 300 and 90 000, more generally between 400 and 50 000, for example in the form of liquid BR, liquid SBR, liquid IR or liquid depolymerized natural rubber, such as described, for example, in the abovementioned patent documents U.S. Pat. No. 4,913,209, 5,085,942 and 5,295,525. Use may also be made of mixtures of such liquid elastomers with oils, such as described below.

Extending oils, in particular those selected from the group consisting of polyolefin oils (that is to say, resulting from the polymerization of olefins, monoolefins or diolefins), paraffinic oils, naphthenic oils (of low or high viscosity and hydrogenated or nonhydrogenated), aromatic or DAE (Distillate Aromatic Extracts) oils, MES (Medium Extracted Solvates) oils, TDAE (Treated Distillate Aromatic Extracts) oils, mineral oils, vegetable oils (and their oligomers, e.g. rapeseed, soybean or sunflower oils) and the mixtures of these oils, are also suitable.

According to a specific embodiment, use is made, for example, of an oil of the polybutene type, in particular a polyisobutylene (abbreviated to "PIB") oil, which has demonstrated an excellent compromise in properties in comparison with the other oils tested, in particular with a conventional oil of the paraffinic type. By way of examples, PIB oils are sold in particular by Univar under the "Dynapak Poly" name (e.g. "Dynapak Poly 190") and by BASF under the "Glissopal" (e.g. "Glissopal 1000") or "Oppanol" (e.g. "Oppanol B12") names; paraffinic oils are sold, for example, by Exxon under the name "Telura 618" or by Repsol under the name "Extensol 51".

Also suitable as liquid plasticizers are ether, ester, phosphate or sulphonate plasticizers, more particularly those selected from esters and phosphates. Mention may be made, as preferred phosphate plasticizers, of those which comprise between 12 and 30 carbon atoms, for example trioctyl phosphate. Mention may in particular be made, as preferred ester plasticizers, of the compounds selected from the group consisting of trimellitates, pyromellitates, phthalates, 1,2-cyclohexanedicarboxylates, adipates, azelates, sebacates, glycerol triesters and the mixtures of these compounds. Mention may be made, among the above triesters, as preferred glycerol triesters, of those which are composed predominantly (for more than 50% by weight, more preferably for more than 80% by weight) of an unsaturated C18 fatty acid, that is to say a fatty acid selected from the group consisting of oleic acid, linoleic acid, linolenic acid and the mixtures of these acids. More preferably, whether of synthetic or natural origin (the case, for example, of sunflower or rapeseed vegetable oils), the fatty acid used is composed, for more than 50% by weight, more preferably still for more than 80% by weight, of oleic acid. Such triesters (trioleates) having a high content of oleic acid are well known—they have been described, for example, in Application WO 02/088238 (or US 2004/0127617)—as plasticizing agents in tyre treads.

The number-average molecular weight (Mn) of the liquid plasticizer is preferably between 400 and 25 000 g/mol, more preferably still between 800 and 10 000 g/mol. For excessively low Mn weights, there exists a risk of migration of the plasticizer to the outside of the composition, whereas excessively high weights can result in excessive stiffening of this composition. An Mn weight of between 1 000 and 4 000 g/mol has proved to constitute an excellent compromise for the targeted applications, in particular for use in a tyre.

The number-average molecular weight (Mn) of the plasticizer can be determined in a known way, in particular by SEC, the sample being dissolved beforehand in tetrahydrofuran at a concentration of approximately 1 g/l; the solution is then filtered through a filter with a porosity of 0.45 µm before injection. The apparatus is the "WATERS Alliance" chromatographic line. The elution solvent is tetrahydrofuran, the flow rate is 1 ml/min, the temperature of the system is 35° C. and the analysis time is 30 min. A set of two "WATERS" columns having the name "STYRAGEL HT6E" is used. The injected volume of the solution of the polymer sample is 100 µl. The detector is a "WATERS 2410" differential refractometer and its associated software for making use of the chromatographic data is the "WATERS MILLENIUM" system. The calculated average molecular weights are relative to a calibration curve produced with polystyrene standards.

To sum up, the liquid plasticizer is preferably selected from the group consisting of liquid elastomers, polyolefin oils, naphthenic oils, paraffinic oils, DAE oils, MES oils, TDAE oils, mineral oils, vegetable oils, ether plasticizers, ester plasticizers, phosphate plasticizers, sulphonate plasticizers and the mixtures of these compounds. More preferably, this liquid plasticizer is selected from the group consisting of liquid elastomers, polyolefin oils, vegetable oils and the mixtures of these compounds.

A person skilled in the art will be able, in the light of the description and implementational examples which follow, to adjust the amount of liquid plasticizer as a function of the specific conditions of use of the self-sealing composition, in particular of the tyre in which it is intended to be used.

Preferably, the content of liquid plasticizer is within a range from 5 to 40 phr, more preferably within a range from 10 to 30 phr. Below the minima indicated, there is a risk of the elastomer composition exhibiting a stiffness which is too high for some applications, whereas, above the recommended maxima, a risk arises of insufficient cohesion of the composition and of a deterioration in the self-sealing properties.

Various Additives

The base constituents of the self-sealing layer described above, namely unsaturated diene elastomer, plasticizing hydrocarbon resin, optional liquid plasticizer and optional filler, are sufficient by themselves alone for the self-sealing composition to fully perform its puncture-resistant role with regard to the tyres in which it is used.

However, various other additives can be added, typically in a small amount (preferably at contents of less than 20 phr, more preferably of less than 15 phr), such as, for example, protection agents, such as UV stabilizers, antioxidants or antiozonants, various other stabilizers, or colouring agents which can advantageously be used for the colouring of the self-sealing composition. According to the application targeted, fibres, in the form of short fibres or of a slurry, might optionally be added to give greater cohesion to the self-sealing composition.

According to a preferred embodiment of the second embodiment of the composition of the layer of self-sealing product, the self-sealing composition additionally comprises a system for crosslinking the unsaturated diene elastomer which can be composed of just one or several compounds. This crosslinking agent is preferably a crosslinking agent based on sulphur and/or on a sulphur donor. In other words, this crosslinking agent is a "vulcanization" agent.

According to a preferred embodiment, the vulcanization agent comprises sulphur and, as vulcanization activator, a guanidine derivative, that is to say a substituted guanidine. Substituted guanidines are well known to a person skilled in the art (see, for example, WO 00/05300): mention will be made, as nonlimiting examples, of N,N'-diphenylguanidine (abbreviated to "DPG"), triphenylguanidine or also di(o-tolyl)guanidine. Use is preferably made of DPG. The sulphur content is, for example, between 0.1 and 1.5 phr, especially between 0.2 and 1.2 phr (in particular between 0.2 and 1.0 phr), and the content of guanidine derivative is itself between 0 and 1.5 phr, in particular between 0 and 1.0 phr (in particular within a range from 0.2 to 0.5 phr).

The said crosslinking or vulcanization agent does not require the presence of a vulcanization accelerator. According to a preferred embodiment, the composition can thus be devoid of such an accelerator or at the very most can comprise less than 1 phr thereof, more preferably less than 0.5 phr thereof.

However, in general, if such an accelerator is used, mention may be made, as an example, of any compound ("primary" or "secondary" accelerator) capable of acting as vulcanization accelerator for diene elastomers in the presence of sulphur, in particular accelerators of the thiazole type and their derivatives, accelerators of sulphenamide, thiuram, dithiocarbamate, dithiophosphate, thiourea and xanthate types. Mention may in particular be made, as examples of such accelerators, of the following compounds: 2-mercaptobenzothiazyl disulphide (abbreviated to "MBTS"), N-cyclohexyl-2-benzothiazolesulphenamide ("CBS"), N,N-dicyclohexyl-2-benzothiazolesulphenamide ("DCBS"), N-(tert-butyl)-2-benzothiazolesulphenamide ("TBBS"), N-(tert-butyl)-2-benzothiazolesulphenimide ("TBSI"), zinc dibenzyldithiocarbamate ("ZBEC"), 1-phenyl-2,4-dithiobiuret ("DTB"), zinc dibutyl phosphorodithioate ("ZBPD"), zinc 2-ethylhexyl phosphorodithioate ("ZDT/S"), bis[O,O-di(2-ethylhexyl)thiophosphonyl]disulphide ("DAPD"), dibutylthiourea ("DBTU"), zinc isopropyl xanthate ("ZIX") and the mixtures of these compounds. According to another advantageous embodiment, the above vulcanization system can be devoid of zinc or of zinc oxide (known as vulcanization activators) or at the very most can comprise less than 1 phr thereof, more preferably less than 0.5 phr thereof.

According to another preferred specific embodiment of the invention, the vulcanization agent comprises a sulphur donor. The amount of such a sulphur donor will be adjusted preferably to between 0.5 and 15 phr, more preferably between 0.5 and 10 phr (in particular between 1 and 5 phr), in particular so as to achieve the preferred equivalent sulphur contents indicated above.

Sulphur donors are well known to a person skilled in the art; mention will in particular be made of thiuram polysulphides, which are known vulcanization accelerators and which have the formula (I):

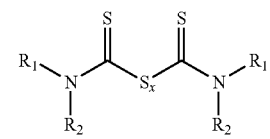

in which:
x is a number (integer, or decimal number in the case of mixtures of polysulphides) which is equal to or greater than two, preferably within a range from 2 to 8;
$R_1$ and $R_2$, which are identical or different, represent a hydrocarbon radical preferably chosen from alkyls having from 1 to 6 carbon atoms, cycloalkyls having from 5 to 7 carbon atoms, or aryls, aralkyls or alkaryls having from 6 to 10 carbon atoms.

In the above formula (I), R1 and R2 might form a divalent hydrocarbon radical comprising from 4 to 7 carbon atoms.

These thiuram polysulphides are more preferably selected from the group consisting of tetrabenzylthiuram disulphide ("TBzTD"), tetramethylthiuram disulphide ("TMTD"), dipentamethylenethiuram tetrasulphide ("DPTT"), and the mixtures of such compounds. Use is more preferably made of TBzTD, particularly at the preferred contents indicated above for a sulphur donor (i.e., between 0.1 and 15 phr, more preferably between 0.5 and 10 phr, in particular between 1 and 5 phr).

In addition to the solid elastomers and other additives described above, the composition of the invention might also comprise, preferably according to a minor fraction by weight with respect to the blend of solid elastomers A and B, solid polymers other than elastomers, such as, for example, thermoplastic polymers.

In addition to the elastomers described above, the self-sealing composition might also comprise, still according to a minor fraction by weight with respect to the unsaturated diene elastomer, polymers other than elastomers, such as, for example, thermoplastic polymers compatible with the unsaturated diene elastomer.

Manufacture of the Layer of Self-Sealing Product

The composition of the self-sealing layer according to the second embodiment described above can be manufactured by any appropriate means, for example by compounding and/or kneading in blade mixers or open mills, until an intimate and homogeneous mixture of its various components has been obtained.

However, the following manufacturing problem may be presented: in the absence of filler, or at the very least of a significant amount of filler, the composition exhibits weak cohesion. This lack of cohesion may be such that the adhesiveness of the composition, furthermore due to the presence of a relatively high content of hydrocarbon resin, is not compensated for and prevails; this then results in a risk of undesirable adhesive bonding to the compounding equipment, which may be unacceptable under industrial processing conditions.

In order to overcome the above problems, the self-sealing composition, when it comprises a vulcanization system, can be prepared according to a process comprising the following stages:

a) in a first step, a masterbatch comprising at least the unsaturated diene elastomer or, as the case may be, the blend of the solid elastomers A and B and between 30 and 90 phr of the hydrocarbon resin is manufactured by mixing these various components in a mixer, at a temperature or up to a temperature referred to as "hot compounding temperature" (or "first temperature") which is greater than the softening point of the hydrocarbon resin;

b) then at least a crosslinking system is incorporated in the said masterbatch, everything being mixed, in the same mixer or in a different mixer, at a temperature or up to a temperature referred to as "second temperature", which is maintained below 100° C., in order to obtain the said self-sealing composition.

The first and second temperatures above are, of course, those of the masterbatch and of the self-sealing composition, respectively, measurable in situ and not the set temperatures of the mixers themselves.

The term "masterbatch" should be understood here, by definition, as meaning the mixture of at least the diene elastomer and of the hydrocarbon resin, the precursor mixture of the final ready-for-use self-sealing composition.

The liquid plasticizer can be incorporated at any time, in all or part, in particular during the manufacture of the masterbatch itself (in this case, before, during or after the incorporation of the hydrocarbon resin in the diene elastomer), "under hot conditions" (that is to say, at a temperature greater than the softening point of the resin) and at a lower temperature, or, for example, after the manufacture of the masterbatch (in this case, before, during or after the addition of the crosslinking system).

Various additives can optionally be incorporated in this masterbatch, whether they are intended for the masterbatch proper (for example, a stabilizing agent, a colouring agent, a UV stabilizer, an antioxidant, and the like) or for the final self-sealing composition for which the masterbatch is intended.

Such a process has proved to be particularly well suited to the rapid manufacture, under processing conditions acceptable from the industrial viewpoint, of an effective self-sealing composition, it being possible for this composition to comprise high contents of hydrocarbon resin without requiring in particular the use of a liquid plasticizer at a particularly high content.

It is during the hot compounding stage a) that the diene elastomer is brought into contact with the hydrocarbon resin for the manufacture of the masterbatch. In the initial state, that is to say before contact thereof with the elastomer, the resin can be provided in the solid state or in the liquid state. Preferably, for better compounding, the solid diene elastomer is brought into contact with the hydrocarbon resin in the liquid state. It is sufficient, for this, to heat the resin to a temperature greater than its softening point. According to the type of hydrocarbon resin used, the hot compounding temperature is typically greater than 70° C., generally greater than 90° C., for example between 100° C. and 150° C.

It is preferable to introduce, at least in part, the liquid plasticizer during the stage a) of manufacture of the masterbatch itself, or preferably, in this case, either at the same time as the hydrocarbon resin or after the introduction of the latter. According to a particularly advantageous embodiment, a mixture of the hydrocarbon resin and of the liquid plasticizer can be prepared prior to the incorporation in the diene elastomer.

The stage b) of incorporation of the crosslinking system is carried out at a temperature preferably of less than 80° C., furthermore preferably less than the softening point of the resin. Thus, according to the type of hydrocarbon resin used, the compounding temperature of the stage b) is preferably less than 50° C., more preferably between 20° C. and 40° C.

If necessary, an intermediate stage of cooling the masterbatch can be inserted between stages a) and b) above, in order to bring its temperature to a value of less than 100° C., preferably less than 80° C., in particular below the softening point of the resin, this before introduction (stage b)) of the crosslinking system into the masterbatch prepared previously.

When a filler, such as carbon black, is used, it can be introduced during stage a), that is to say at the same time as the unsaturated diene elastomer and the hydrocarbon resin, or else during stage b), that is to say at the same time as the crosslinking system. It has been found that a very low proportion of carbon black, preferably of between 0.5 and 2 phr, further improves the compounding and the manufacture of the composition, and its final extrudability.

Figure 9:
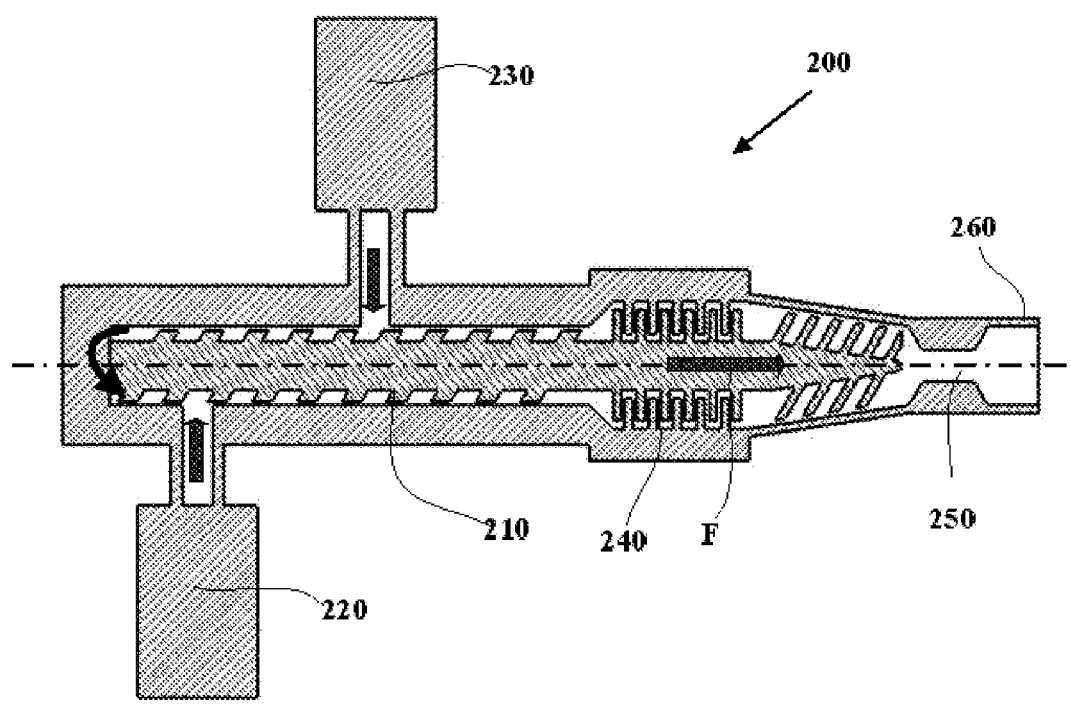
FIG. 9 exhibits an example of an extrusion/compounding device which can be used for the manufacture of a self-sealing product composition.

The stage a) of manufacture of the masterbatch is preferably carried out in a compounding screw extruder, as represented diagrammatically, for example, in a simple way, in FIG. 9.

This FIG. 9 shows a compounding screw extruder 200 essentially comprising an extrusion screw (for example a single screw) 210, a first metering pump 220 for the diene elastomer (solid) and at least one second metering pump 230 for the resin (solid or liquid) and the liquid plasticizer. The hydrocarbon resin and the liquid plasticizer can be introduced, for example, by means of a single metering pump, if they have already been mixed beforehand, or else can be introduced separately by means of a second pump and a third pump (third pump not represented in FIG. 9, for simplicity), respectively. The metering pumps 220, 230 make it possible to increase in pressure while retaining control of the metering and the initial characteristics of the materials, the separation of the metering (elastomer, resin and liquid plasticizer) and compounding functions in addition offering better control of the process.

The products, pushed by the extrusion screw, are intimately mixed under the very strong shearing contributed by the rotation of the screw, thus progressing through the mixer, for example up to a "chopper-homogenizer" part 240, at the outlet of which zone the final masterbatch 250 thus obtained, progressing in the direction of the arrow F, is finally extruded through a die 260 which makes it possible to extrude the product at the desired dimensions.

The masterbatch thus extruded, which is ready to be used, is subsequently transferred and cooled, for example on an external mixer of the two-roll open mill type, for introduction of the crosslinking system and the optional filler, the temperature inside the said external mixer being kept lower than 100° C., preferably lower than 80° C., and, furthermore, being preferably lower than the softening point of the resin. Advantageously, the above rolls are cooled, for example by circulation of water, to a temperature of less than 40° C., preferably of less than 30° C., so as to prevent any undesirable adhesive bonding of the composition to the walls of the mixer.

It is possible to directly form the masterbatch at the outlet of the extrusion device 200 in order to make it easier to transport it and/or to place it on the external mixer. It is also possible to use continuous feeding of the external mixer of the two-roll open mill type.

By virtue of the preferred specific device and preferred process which are described above, it is possible to prepare the composition of the layer of self-sealing product under satisfactory industrial conditions, without the risk of contaminating the equipment due to undesirable adhesive bonding of the composition to the walls of the mixers.

III. Manufacture of the Tyres

The tyres of FIGS. 4 and 8 can be manufactured, as indicated in the document WO 2011/032886, by incorporating a layer of self-sealing product in a nonvulcanized tyre blank using a manufacturing drum and the other techniques normal in the manufacture of tyres.

More specifically, a protective layer, for example a chlorinated thermoplastic film, is applied first to the manufacturing drum. This protective layer can be wound all around the manufacturing drum and then welded. It is also possible to install a pre-welded protective sleeve. All the other normal components of the tyre are subsequently applied, successively.

The layer of self-sealing product is positioned directly on the protective layer. This layer was preformed beforehand by any known technique, for example extrusion or calendering. Its thickness is preferably greater than 0.3 mm, more preferably between 0.5 and 10 mm (in particular, for tyres of passenger vehicles, between 1 and 5 mm). An airtight layer is then placed on the self-sealing layer, followed by the carcass ply.

In a two-step manufacturing process, the tyre blank is then shaped to take the form of a torus. The protective layer, composed of a composition based on a chlorinated thermoplastic polymer film, has a sufficiently low stiffness and sufficient uniaxial and biaxial extensibility and is sufficiently bonded to the surface of the self-sealing layer, due to the tack of the latter, to follow the movements of the tyre blank without detaching or tearing.

After the shaping, the crown plies and the tread are positioned on the blank of the tyre. The blank, thus completed, is placed in a curing mould and is vulcanized. During the vulcanization, the protective layer protects the curing membrane of the mould from any contact with the self-sealing layer.

On departing from the curing mould, the protective layer remains attached to the layer of self-sealing product. This protective layer does not comprise any crack or tear and detaches without any difficulty from the curing membrane.

The tyres of FIGS. 4 and 8 can also be manufactured using a rigid core which imposes the shape of the internal cavity of the tyre. In this process, first the protective layer is applied to the surface of the core, followed by all the other constituents of the tyre. The application to the core is carried out in the order required by the final architecture. The constituents of the tyre are positioned directly in their final place, without being subjected to shaping at any point in the preparation. This preparation can in particular use the devices described in Patent EP 0 243 851 for the positioning of the threads of the carcass reinforcement, EP 0 248 301 for the positioning of the crown reinforcements and EP 0 264 600 for the positioning of the rubber liners. The tyre can be moulded and vulcanized as set out in U.S. Pat. No. 4,895,692. The presence of the protective layer makes it possible, as in the case of the curing membrane, to easily separate the tyre from the core on conclusion of the vulcanization phase.

It is also possible to install the layer of self-sealing product after the vulcanization of the tyre by any appropriate means, for example by adhesive bonding, by spraying or also by direct extrusion over the internal surface of the tyre.

The layers of self-sealing product presented in FIGS. 4 and 8 correspond to the second embodiment described above. These layers are composed of a self-sealing composition comprising the three essential constituents, which are natural rubber (100 phr), approximately 50 phr of hydrocarbon resin ("Escorez 2101" from Exxon Mobil—softening point equal to approximately 90° C.) and approximately 15 phr of liquid polybutadiene ("Ricon 154" from Sartomer Cray Valley—Mn equal to approximately 5200); it additionally comprises a very small amount (1 phr) of carbon black (N772).

The above self-sealing composition was prepared using a single-screw extruder (L/D=40) as represented diagrammatically in FIG. 9 (already commented upon above); the three basic constituents (NR, resin and liquid plasticizer) were mixed at a temperature (of between 100 and 130° C.) greater than the softening point of the resin. The extruder used comprises two different feeds (hoppers) (NR, on the one hand, resin and liquid plasticizer, on the other hand, mixed beforehand at a temperature of 130 to 140° C. approximately) and a pressurized liquid injection pump for the resin/liquid plasticizer mixture (injected at a temperature of 100 to 110° C. approximately); when the elastomer, the resin and the liquid plasticizer are thus intimately mixed, it has been found that the undesirable tackiness of the composition very significantly decreased.

Similar results have been obtained using, as self-sealing layer, a composition comprising a thermoplastic styrene TPS elastomer, as described above.

The above extruder was provided with a die which makes it possible to extrude the masterbatch at the desired dimensions towards an external mixer of the two-roll open mill type, for final incorporation of the other constituents, namely the sulphur-based vulcanization system (for example 0.5 or 1.2 phr) and DPG (for example 0.3 phr) and carbon black (at a content of 1 phr), at a low temperature maintained at a value of less than +30° C. (cooling of the rolls by circulation of water).

IV. Tyre Tests

IV-1. Unseating Test

The test method used to characterize the resistance of tyres to unseating under run flat conditions is described in document EP 1 650 543 A2.

This method involves, having reduced the inflation pressure of the tyre and wheel assembly to a zero value at the test site, causing pressure to be applied suddenly to the deflated side, with an input rate set at 60 km/h, by a rapid turn of the steering wheel.

The rates of turn of the steering wheel for causing this pressure are greater than 500°/s.

The test proceeds with a succession of passes or gradually, with the imposed steering wheel angles increasing, starting from 90°.

The steering wheel angle is held for 2 seconds by the driver who then notes the maximum acceleration recorded and repeats the manoeuvre with a higher steering wheel angle. In order to keep control over the input speed and record maximum accelerations, the test vehicle is equipped with acceleration measurement sensors. The speed is either deduced from the measured accelerations or measured directly.

The test is over when the tested tyre becomes unseated or the steering wheel runs out of steering lock.

The maximum value of acceleration recorded and the steering wheel angle that caused the unseating is given.

Tests were carried out on tyres corresponding to FIG. 4 (tyre B) and FIG. 8 (tyre T) of size 205/55 R16 Primacy, mounted on rims H2 and an Audi A4.

The results were as follows:

TABLE 1

| Tyre | Maximum transverse acceleration value | Steering wheel angle |
| --- | --- | --- |
| B | 0.59 g | 240° |
| T | 0.62 g | 240° |

These tests show that these two designs of tyre, when mounted on a rim of geometry H2, are able to withstand a transverse acceleration markedly in excess of 0.5 g without unseating.

It should be noted that the presence of the layer of self-sealing product meant that this test could be performed under run flat conditions. Without this layer the sidewall of the tyres would have been destroyed too quickly.

IV-2. Run Flat Test

The method for testing self-supporting tyres or tyres fitted with supports is that the tyre and wheel assembly tested is run under run flat conditions, under nominal load, in a straight line and at a speed of 80 km/h until the driver picks up signals such as vibrations indicating that the tyre is damaged.

In the case of tyres corresponding to FIG. 4 (tyre B) and FIG. 8 (tyre T) with no additional lenticular member and therefore involving bead/sidewall contact as soon as they run flat, this test method cannot apply because the signals such as vibrations are felt right from the start of the run flat running.

Tests running at reduced speed were carried out with these tyres with and without a layer of self-sealing product, and mounted on rims and a vehicle similar to the preceding tests. These tests demonstrated that the presence of a layer of self-sealing product as previously described, combined with a bead structure that is resistant to unseating allows the tyre resistance to run flat conditions be increased from a distance of the order of 3 km up to a distance in excess of 5 km while maintaining the ability to steer the vehicle.

This result shows just how beneficial the presence of this layer of self-sealing product is at extending the life of the tyres under run flat conditions.

Of course, the presence of an additional lenticular member positioned between the carcass ply and the inner liner makes it possible to increase the structural support of the tyres and the life thereof under run flat conditions.

IV-3. Resistance to Perforation Test

Tests have been carried out on tyres corresponding to FIG. 4 (tyre B) and FIG. 8 (tyre T) with and without layer of self-sealing product 55, fitted to rims and a vehicle which are similar to the preceding tests. The layer of self-sealing product has a thickness of 3 mm.

Eight perforations with a diameter of 5 mm were produced, on one of the fitted and inflated tyres, through the tread and the crown block using punches, which were immediately withdrawn.

This tyre withstood running on a rolling drum at 150 km/h, under a nominal load of 400 kg, without loss of pressure for more than 1500 km, beyond which distance running was stopped.

The same procedure was carried out on another tyre, this time leaving the perforating objects in place for a weak. The same excellent result was obtained.

Without self-sealing composition and under the same conditions as above, the tyre thus perforated loses its pressure in less than one minute, becoming completely incapable of running.

Endurance tests were carried out on tyres in accordance with the invention, identical to the above but having run for 750 km, up to a speed of 150 km/h, this time leaving the punches in place in their perforations. After extraction of the punches (or expulsion of the latter following the running), these tyres of the invention withstood running on a rolling drum without loss of pressure, under the same conditions as above (distance traveled of 1500 km at a speed of 150 km/h and under a nominal load of 400 kg).

The invention is not restricted to the examples described and represented and various modifications can be made thereto without departing from the scope of the invention as defined by the attached claims.

The invention claimed is:

1. A tire in a form of a torus that is open radially on an inside portion, the tire comprising:
    inner and outer walls, the inner wall being covered, at least in part, with an airtight layer;
    a crown;
    two beads, each bead including an annular reinforcing structure;
    two sidewalls extending from the crown to the beads;
    a crown reinforcement;
    a carcass reinforcement anchored in the beads and extending at least from the beads to the crown;
    a layer of self-sealing product covering, at least in part, the airtight layer; and
    a reinforcing lenticular member arranged in a sidewall region between the airtight layer and the carcass reinforcement,
    wherein each annular reinforcing structure includes a plurality of windings formed of a single metal thread,
    wherein the windings are arranged in a plurality of layers, with the layers being superposed radially,
    wherein each layer includes a group of the windings arranged side by side axially,
    wherein the layers are arranged to have a hexagonal cross section,
    wherein the reinforcing lenticular member is formed of a rubber compound and has a maximum thickness between 0.5 and 10 mm,
    wherein the carcass reinforcement includes a plurality of carcass reinforcing elements arranged adjacently and aligned circumferentially,
    wherein, for each bead, the carcass reinforcement is anchored in the bead by a turn-up around the annular reinforcing structure of the bead so as to form an outward strand and a return strand, the return strand extending radially outward as far as an end situated a radial distance DRR from a radially innermost point of the annular reinforcing structure of the bead, the radial distance DRR being greater than or equal to 7% and less than or equal to 30% of a radial height H of the tire,
    wherein each bead further includes a filling formed of at least a rubber compound, the filling being situated radially outside of the annular reinforcing structure of the bead and at least partially between the outward strand and the return strand of the carcass reinforcement,
    corresponding to the bead, the filling extending radially outside of a radially innermost point of the annular reinforcing structure of the bead as far as a radial distance DRB from the radially innermost point, the radial distance DRB being between 20 and 45% of the radial height H of the tire, wherein each bead further includes an outer strip formed of at least a rubber compound, the outer strip being positioned axially outside of the carcass reinforcement and of the filling, the outer strip extending radially between a radially inner end of the outer strip and a radially outer end of the outer strip, the radially inner end of the outer strip being situated a distance DRI from the radially innermost point of the annular reinforcing structure of the bead, the radial distance DRI being between 1 and 10% of the radial height H of the tire, the radially outer end of the outer strip being situated a distance DRL from the radially innermost point of the annular reinforcing structure of the bead, the radial distance DRL being between 35 and 50% of the radial height H of the tire, wherein each bead further includes a protector formed of at least a rubber compound, the protector being structured to come into contact with a rim seat, and the protector extending axially partially outside relative to the outer strip, wherein, for each bead, an assembly formed by the rubber compounds of the filling, the outer strip, and the protector has a maximum thickness E, measured in any radial plane in a direction perpendicular to the outward strand of the carcass reinforcement, corresponding to the assembly, such that a ratio E/DRL is greater than 15%, and wherein a modulus at 10% elongation of the rubber compounds of the filling, the outer strip, and the protector is between 5 and 15 MPa.

2. The tire according to claim 1,
wherein the reinforcing lenticular member has a maximum thickness between 0.5 and 4 mm, and
wherein E/DRL is greater than 20%.

3. The tire according to claim 1, wherein the metal thread has a cross-sectional shape that is one of:
a circle, a square, a rectangle, and a hexagon.

4. The tire according to claim 1, wherein the radially superposed layers are arranged in a 3-4-5-4-3 configuration.

5. The tire according to claim 1, wherein the radially superposed layers are arranged in a 3-4-3-2 configuration.

6. The tire according to claim 1, wherein a cross-section of the metal thread has a maximum dimension between 1 and 1.8 mm.

7. The tire according to claim 6, wherein the metal thread has a hexagonal cross section with a side length between 0.7 and 0.9 mm.

8. The tire according to claim 6, wherein the metal thread has a circular cross section with a diameter between 1.0 and 1.6 mm.

9. The tire according to claim 1, wherein the metal thread has a hexagonal cross-section.

10. The tire according to claim 9, wherein the maximum thickness of the reinforcing lenticular member is between 0.5 and 2.5 mm.

11. The tire according to claim 1, wherein the maximum thickness of the reinforcing lenticular member is between 0.5 and 2.5 mm.

12. The tire according to claim 1, wherein the layer of self-sealing product is positioned on the airtight layer facing at least the crown.

13. The tire according to claim 12, wherein the layer of self-sealing product extends over the airtight layer facing the crown and at least a portion of the sidewalls.

14. The tire according to claim 1, wherein the self-sealing layer comprises one thermoplastic styrene ("TPS") elastomer and more than 200 phr of an extending oil for the elastomer (phr meaning parts by weight per hundred parts of elastomer).

15. The tire according to claim 14, wherein the TPS elastomer is the predominant elastomer of the self-sealing layer.

16. The tire according to claim 14, wherein the TPS elastomer is selected from a group consisting of: styrene/butadiene/styrene (SBS) block copolymers, styrene/isoprene/styrene (SIS) block copolymers, styrene/isoprene/butadiene/styrene (SIBS) block copolymers, styrene/ethylene/butylene/styrene (SEBS) block copolymers, styrene/ethylene/propylene/styrene (SEPS) block copolymers, styrene/ethylene/ethylene/propylene/styrene (SEEPS) block copolymers, and mixtures thereof.

17. The tire according to claim 16, wherein the TPS elastomer is selected from a group consisting of: SEBS block copolymers, SEPS block copolymers, and mixtures thereof.

18. The tire according to claim 1, wherein the self-sealing layer comprises:
(a) as predominant elastomer, an unsaturated diene elastomer;
(b) between 30 and 90 phr of a hydrocarbon resin;
(c) a liquid plasticizer having a glass transition temperature Tg less than −20° C. at a content by weight of between 0 and 60 phr (phr meaning parts by weight per hundred parts of solid elastomer); and
(d) from 0 to less than 120 phr of a filler.

19. The tire according to claim 18, wherein the unsaturated diene elastomer is selected from a group of elastomers consisting of: polybutadienes, natural polyisoprene rubber, synthetic polyisoprenes, butadiene copolymers, isoprene copolymers, and mixtures thereof.

20. The tire according to claim 19, wherein the unsaturated diene elastomer is an isoprene elastomer.

21. The tire according to claim 19, wherein the unsaturated diene elastomer is a blend of at least two solid elastomers including elastomer A and elastomer B, with elastomer A being a polybutadiene copolymer elastomer or a butadiene copolymer elastomer, with elastomer B being a natural polyisoprene rubber or a synthetic polyisoprene elastomer, and with an elastomer A:elastomer B ratio by weight being within a range of from 10:90 to 90:10.

22. The tire according to claim 21, wherein the elastomer A:elastomer B ratio by weight is within a range of from 20:80 to 80:20.

23. The tire according to claim 18, wherein the filler content is from 0 to less than 100 phr and the filler includes a reinforcing filler at a reinforcing-filler content of from 0 to less than 15 phr.

24. The tire according to claim 18, wherein the filler content is from 0 to 70 phr and the filler includes from 0 to less than 5 phr of a reinforcing filler.

25. The tire according to claim 18, wherein the filler content is from 5 to 70 phr and the filler is not a reinforcing filler.

26. The tire according to claim 18, further comprising a crosslinking agent that includes sulphur or a sulphur donor.

27. The tire according to claim 26, wherein the sulphur donor is a thiuram polysulphide.

28. An assembly comprising:
a wheel; and
a tire according to claim 1, which is mounted on the wheel.

29. An assembly according to claim 28, further comprising:
a pressure sensing device attached to the wheel or the tire.

* * * * *

UNITED STATES PATENT AND TRADEMARK OFFICE
CERTIFICATE OF CORRECTION

Page 1 of 2

PATENT NO. : 10,369,850 B2
APPLICATION NO. : 14/389882
DATED : August 6, 2019
INVENTOR(S) : Jose Merino Lopez et al.

It is certified that error appears in the above-identified patent and that said Letters Patent is hereby corrected as shown below:

In the Specification

Column 1:
Line 43, "Type" should read --Tire--.

Column 7:
Line 7, "angled" should read --angle--.

Column 9:
Line 37, "structure" should read --structure,--.

Column 10:
Line 2, "show" should read --shows--.

Column 10:
Line 10, "70" should read --70,--.

Column 12:
Line 45, "a isoprene" should read --an isoprene--.

Column 12:
Line 63, "greater 90%," should read --greater than 90%,--.

Column 16:
Line 11, "according" should read --according to--.

Column 19:
Line 48, "FIB" should read --PIB--.

Signed and Sealed this
Third Day of March, 2020

Andrei Iancu
*Director of the United States Patent and Trademark Office*

CERTIFICATE OF CORRECTION (continued)
U.S. Pat. No. 10,369,850 B2

Column 27:
Line 41, "be" should read --to be--.

Column 27:
Line 66, "weak." should read --week.--.

Column 28:
Lines 64 ("ment,") and 65 ("corresponding..."), should be joined.